US011741969B1

(12) United States Patent
Rao et al.

(10) Patent No.: US 11,741,969 B1
(45) Date of Patent: Aug. 29, 2023

(54) CONTROLLED ACCESS TO DEVICE DATA

(71) Applicant: Amazon Technologies, Inc., Seattle, WA (US)

(72) Inventors: Vinay R Rao, Fremont, CA (US); Nima Homayoun, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 474 days.

(21) Appl. No.: 16/844,310

(22) Filed: Apr. 9, 2020

(51) Int. Cl.
*G10L 17/22* (2013.01)
*G06F 21/62* (2013.01)
*G06F 16/23* (2019.01)

(52) U.S. Cl.
CPC .......... *G10L 17/22* (2013.01); *G06F 16/2379* (2019.01); *G06F 21/6218* (2013.01)

(58) Field of Classification Search
CPC ... G10L 17/22; G06F 16/2379; G06F 21/6218
See application file for complete search history.

(56) References Cited

U.S. PATENT DOCUMENTS

| 10,163,437 B1* | 12/2018 | St. Angel | G06N 7/005 |
| 2015/0213355 A1* | 7/2015 | Sharma | G10L 15/22 |
| | | | 706/11 |
| 2016/0105754 A1* | 4/2016 | Carlsson | H04S 7/303 |
| | | | 381/81 |
| 2020/0342855 A1* | 10/2020 | Casado | G10L 15/183 |

* cited by examiner

*Primary Examiner* — Philip J Chea
*Assistant Examiner* — Sangseok Park
(74) *Attorney, Agent, or Firm* — Pierce Atwood LLP

(57) ABSTRACT

Techniques for improving a natural language processing (NLP) system by providing controlled access to event data to third party systems. For example, the system may control access to event data in a secured way that allows for expanded functionality such as at home games using existing sensors/devices. The system may generate event data using sensor data received from the devices and may enable a customer to configure which devices/sensors a third party system is allowed to access. In addition, the system may only send event data after receiving permission from the customer, such as upon receiving a command to begin a game. The third party system may use the event data to provide additional functionality to the customer during a period of time, which ends at the conclusion of the game, a command from the user to end the game, and/or after a timeout even occurs.

17 Claims, 28 Drawing Sheets

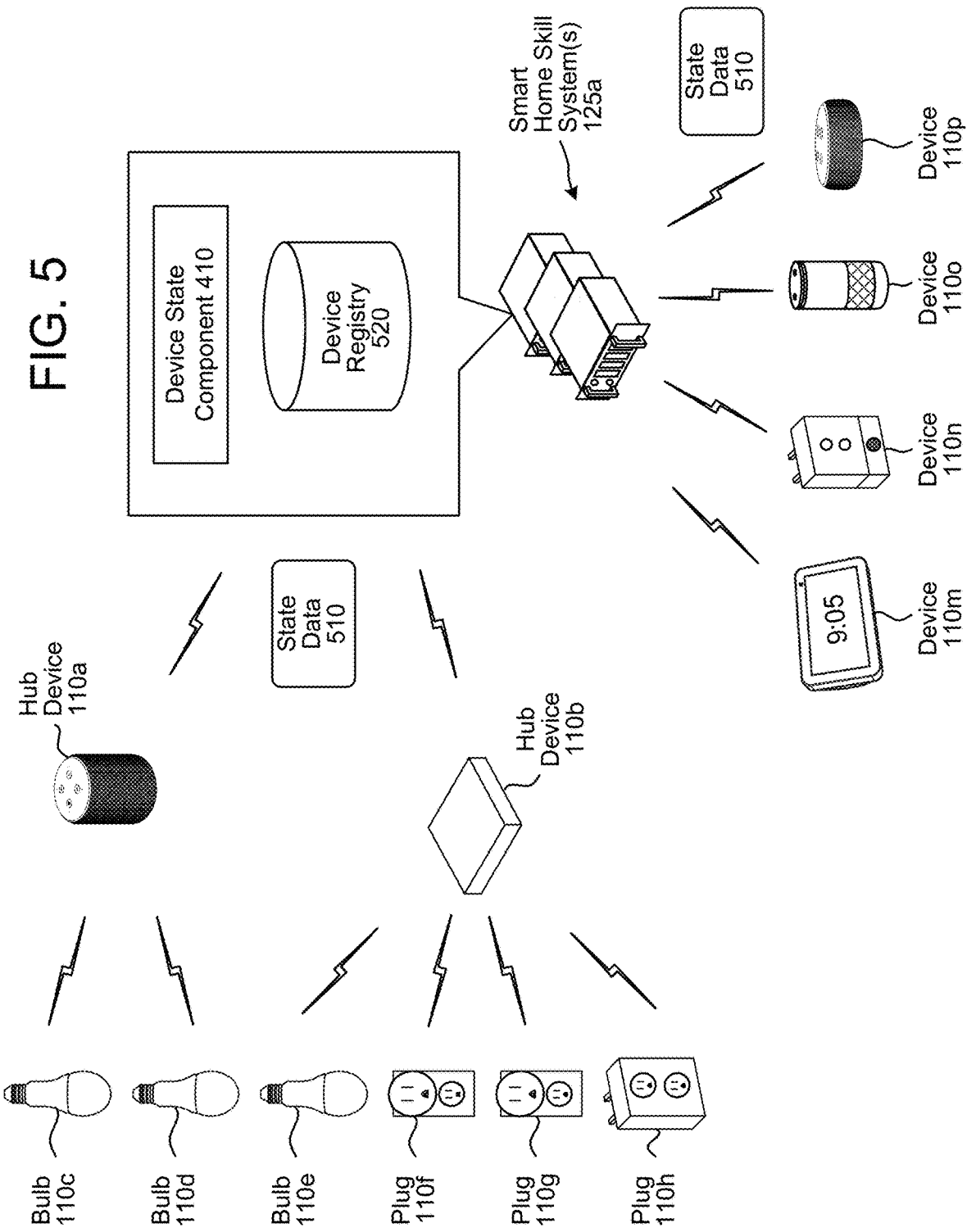

FIG. 6

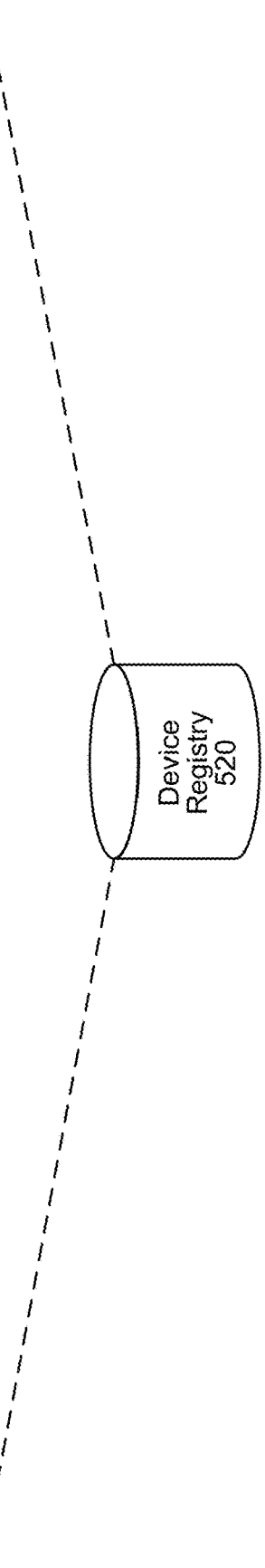

| Customer Profile | Device ID | IP Address | Device Name | Qualifier(1) | Qualifier(1) | ... | Qualifier(n) | Device State |
|---|---|---|---|---|---|---|---|---|
| CustomerID1 | 444-xxx-332 | 194.66.82.11 | Office Echo | Upstairs | Office | ... | ... | Audio Output |
| CustomerID1 | 567-xjw-432 | 192.65.82.31 | Living Room Echo Show | Living Room | ... | ... | ... | Idle |
| CustomerID1 | 498-jij-879 | N/A | Motion Sensor | Upstairs | Hallway | ... | ... | Idle |
| ... | ... | ... | ... | ... | ... | ... | ... | ... |
| <CustomerID> | <DeviceID> | <IPAddress> | <Device> | <Qualifier> | <Qualifier> | ... | <Qualifier> | <DeviceState> |

Device Registry 520

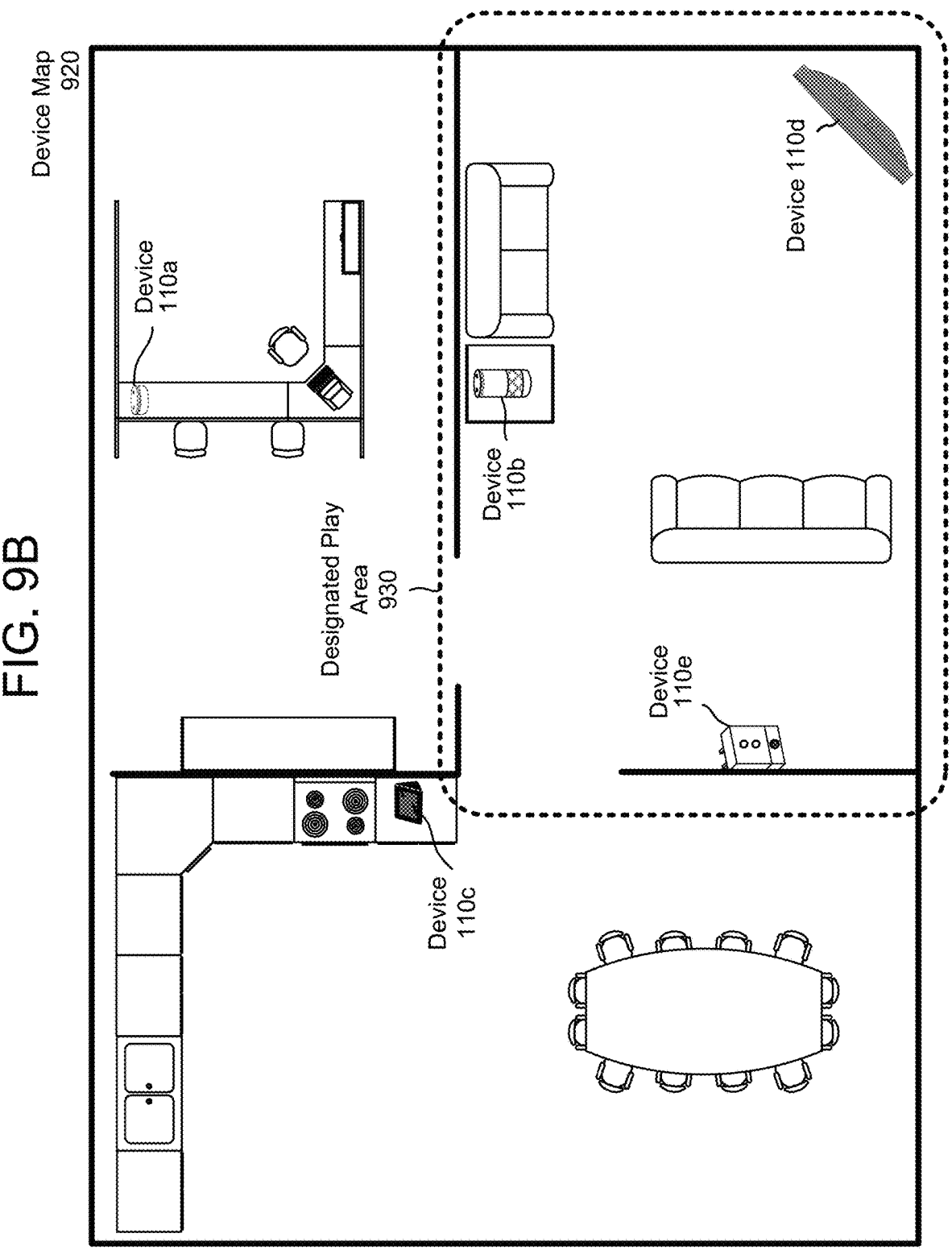

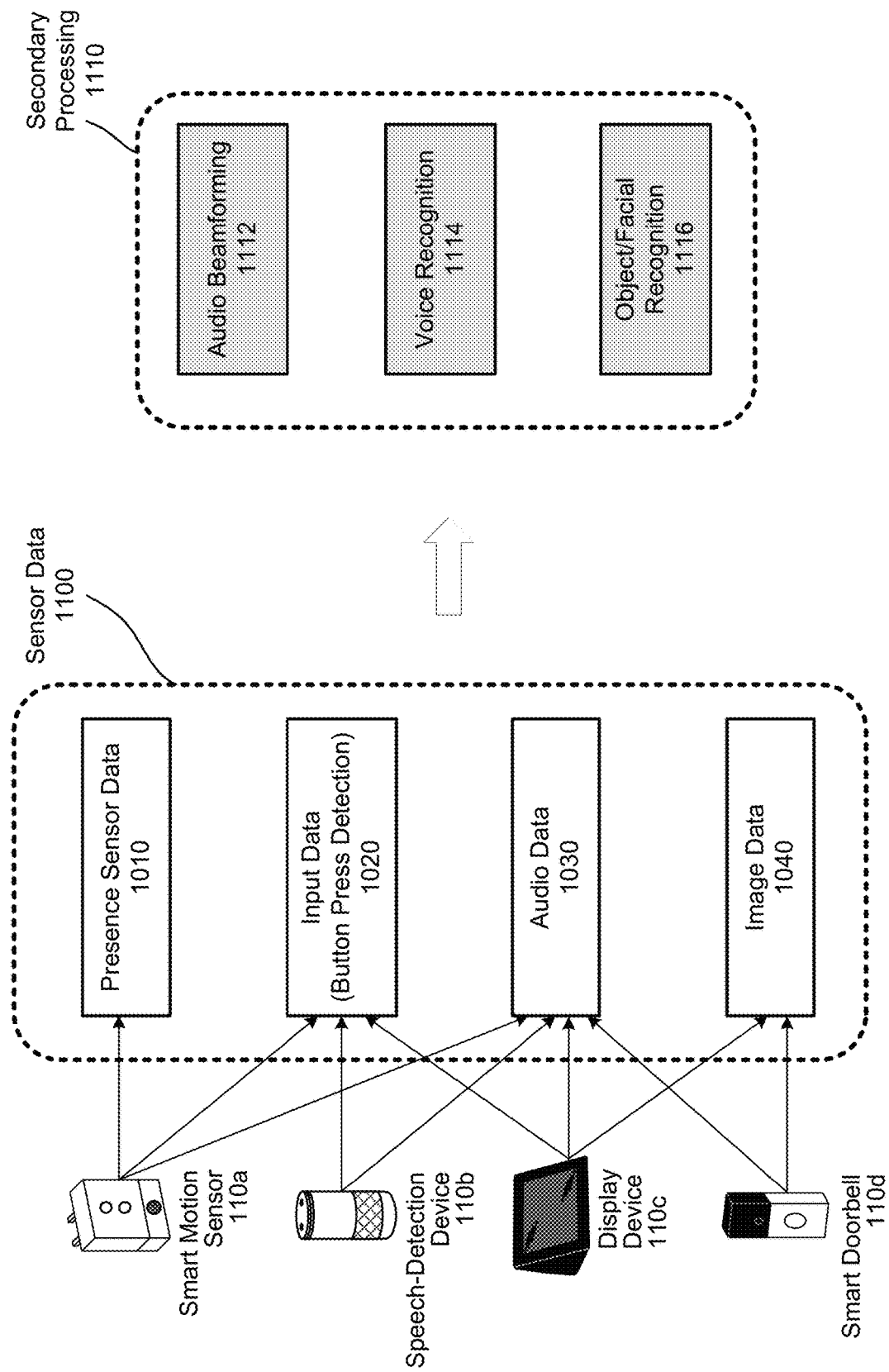

FIG. 11B

Event Data 1120
- Motion Event 1130
- User Motion Event 1135
- Button Press Event 1140
- Audio Detected Event 1145
- Speech Detected Event 1150
- User Speech Event 1155
- Location Event (Beamforming) 1160
- Location Event (Object Recognition) 1165
- Object Detected Event 1170
- Face Detected Event 1175
- User Detected Event 1180

Sensor Data 1100
- Presence Sensor Data 1010
- Input Data (Button Press Detection) 1020
- Audio Data 1030
- Image Data 1040

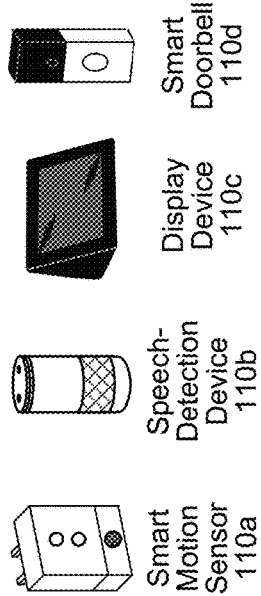

Smart Motion Sensor 110a
Speech-Detection Device 110b
Display Device 110c
Smart Doorbell 110d Device Permissions
1210

Sensor Permissions
1220

FIG. 12C

+ Device1 ☐
− Device2 ☒
   Sensor1 ☒
   Sensor2 ☐
   Sensor3 ☒
   ...
+ DeviceN ☐

Detailed Permissions
1230

FIG. 12D

Timeout: 30m

+ Skill1 ☒
− Skill2 ☐
  + Device1 ☒
  − Device2 ☐
    Button Input ☒
    Microphone ☐
    Camera ☒
...
+ SkillN ☐

Detailed Permissions
1240

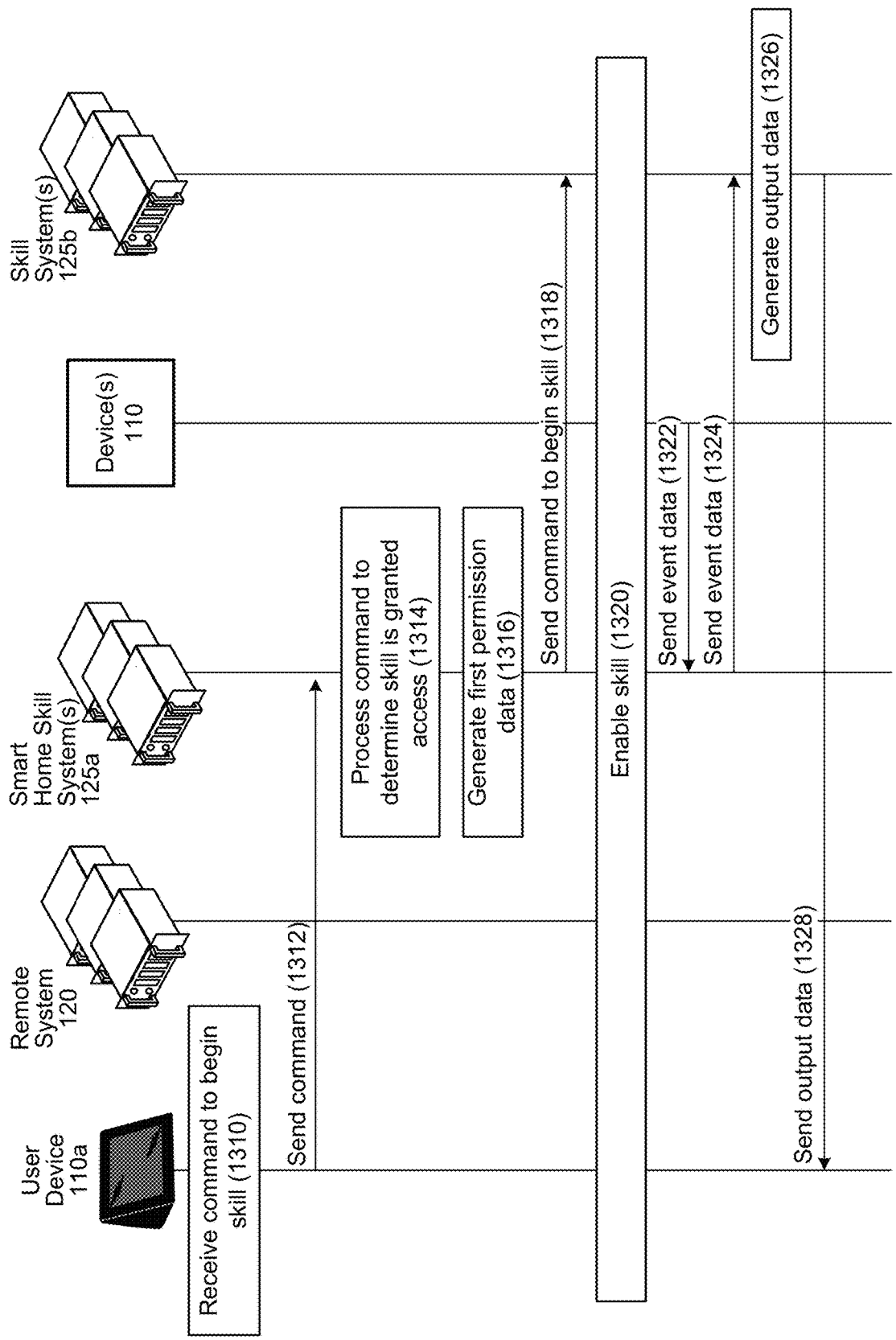

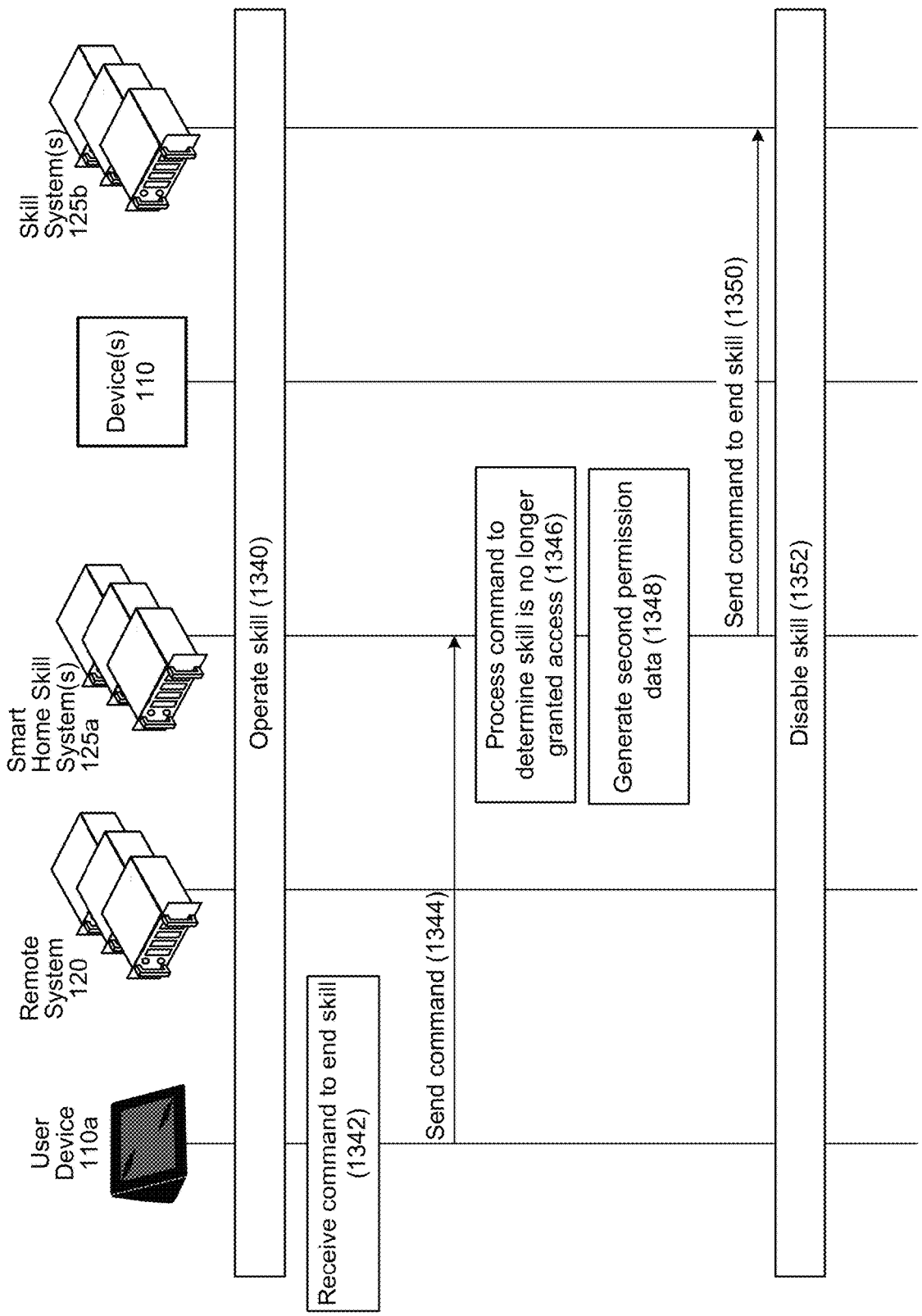

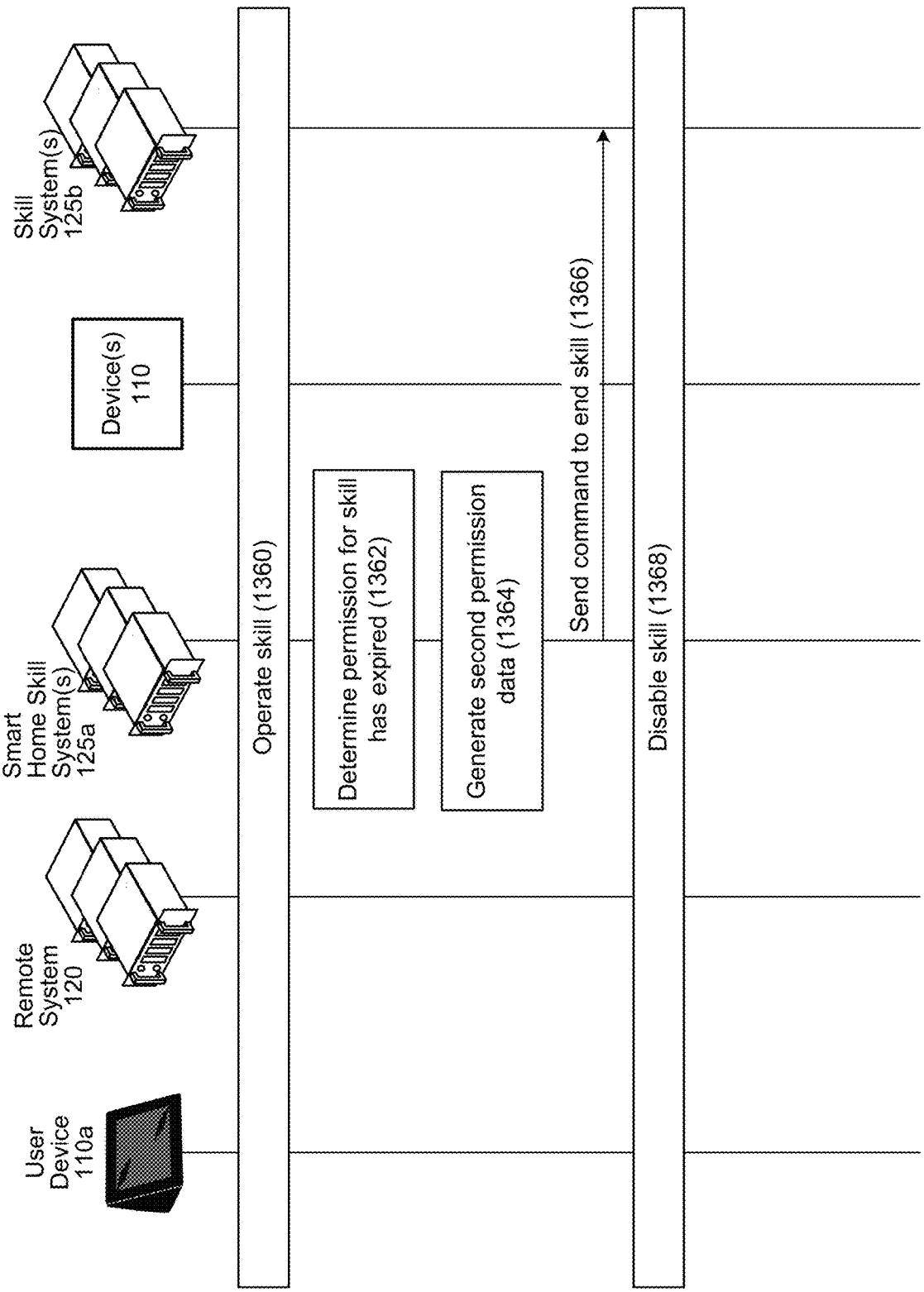

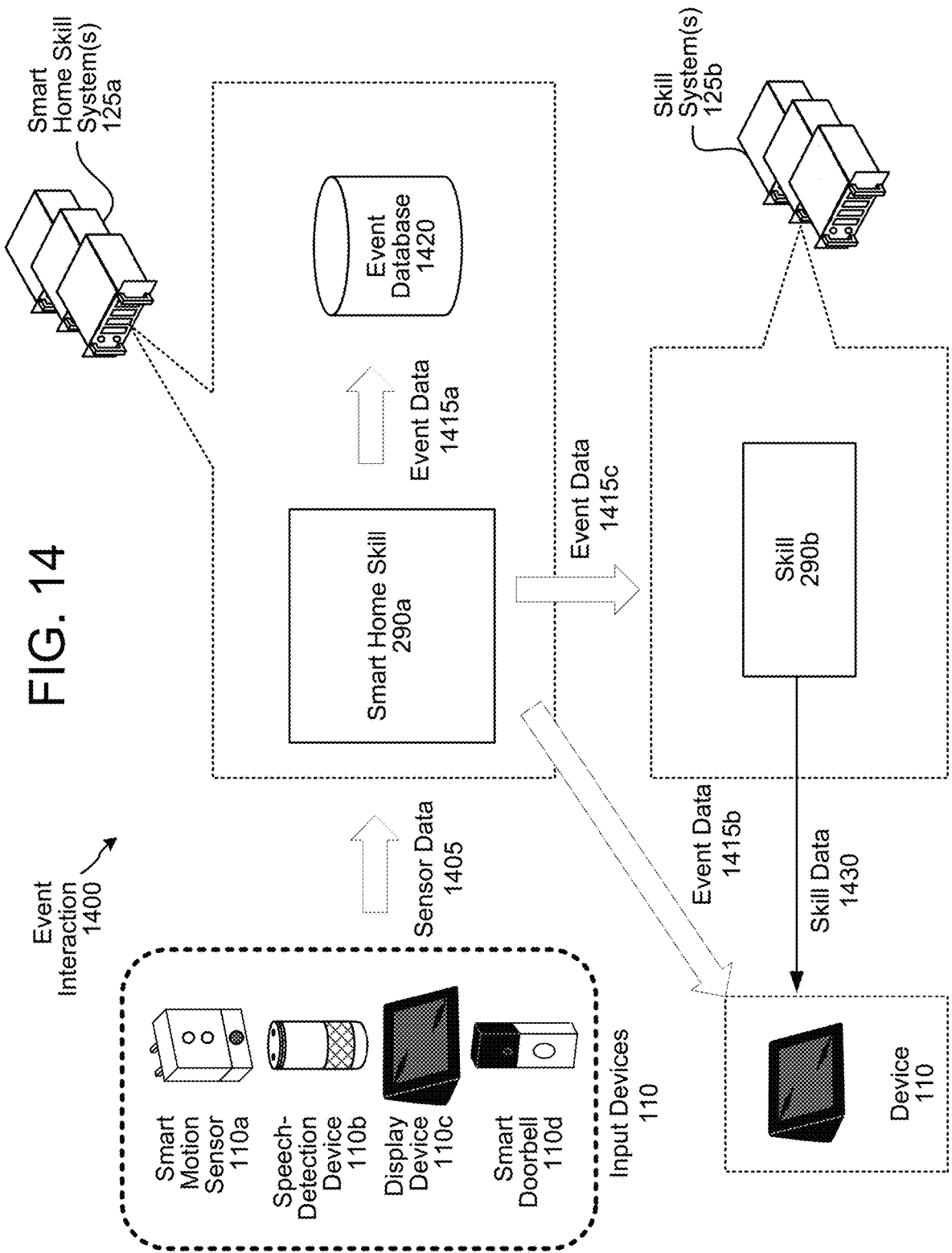

CONTROLLED ACCESS TO DEVICE DATA

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 illustrates a conceptual diagram of devices and data utilized in a smart home environment.

FIG. 6 illustrates an example of information included in a device registry.

FIGS. 9A-9B illustrate examples of an environment and devices within the environment according to embodiments of the present disclosure.

FIGS. 11A-11B are conceptual diagrams illustrating examples of secondary processing and generating event data.

FIGS. 12A-12D are conceptual diagrams illustrating examples of controlling permissions for different devices, sensors, and/or skills.

FIGS. 13A-13C are network diagrams illustrating examples of enabling and disabling skills.

FIG. 14 is a conceptual diagram illustrating an example of sending event data to a skill.

DETAILED DESCRIPTION

Figure 1:
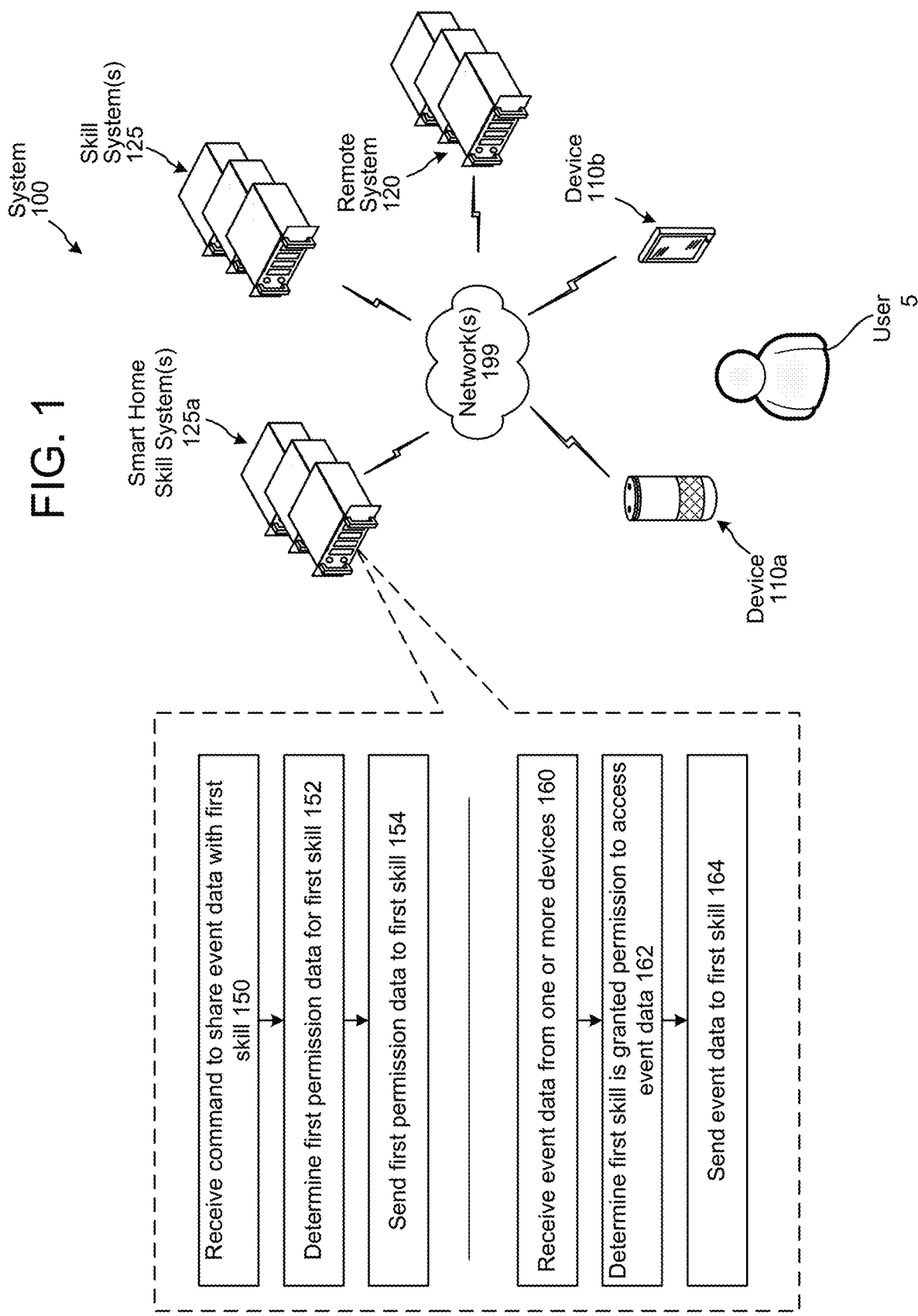
FIG. 1 is a conceptual diagram illustrating a system configured to provide controlled access to event data to third party systems.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). Thus, a system may receive a natural language input, process the natural language input to determine an action to be performed that is responsive to the natural language input, and invoke a skill system to perform the action. For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

To improve a customer experience while protecting private information, the present disclosure improves such systems by providing a mechanism for controlling access to event data for data receiving systems. For example, the system may control access to event data in a secured way that allows for expanded functionality such as at multi-room home gaming using motion sensors, devices, etc. in different rooms. The system may generate the event data using sensor data received from the devices, such as audio data, image data, motion sensor data, and/or other input data generated by one or more sensors. The system may enable a customer to configure which devices/sensors a data receiving system is allowed to access, such that the system only sends event data corresponding to the devices/sensors to the data receiving system. In addition, the system may only send the event data after receiving permission from the customer, such as upon receiving a command to begin a game. The data receiving system may use the event data to provide additional functionality to the customer during a period of time, which ends at the conclusion of the game, a command from the user to end the game, and/or after a timeout even occurs.

FIG. 1 illustrates an example of a system 100 configured to provide controlled access to event data to data receiving systems. Although the figures and discussion of the present disclosure illustrate certain steps in a particular order, the steps described may be performed in a different order (as well as certain steps removed or added) without departing from the present disclosure. As shown in FIG. 1, the system 100 may include one or more devices (110a/110b) local to a user 5, a natural language processing (NLP) remote system 120, a smart home skill system(s) 125a, and one or more skill system(s) 125. As illustrated in FIG. 1, the one or more devices (110a/110b), the remote system 120, the smart home skill system(s) 125a, and the skill system(s) 125 may communicate across one or more networks 199. While the user 5 is illustrated as being a human, other types of users (e.g., computing systems) may exist.

FIG. 1 includes a process flow illustrating how the smart home skill system(s) 125a may provide controlled access to event data to data receiving systems (e.g., skill system(s) 125). As described in greater detail below with regard to FIG. 2, the remote system 120 may be configured to perform natural language processing (NLP) to determine actions responsive to input commands received from the user 5. For example, the remote system 120 may process audio data received from the first device 110a to determine an action to perform that is responsive to a voice command represented in the audio data. However, the disclosure is not limited thereto and the remote system 120 may receive input commands using any techniques known to one of skill in the art.

In some examples, the remote system 120 may perform an action by interacting with the one or more skill system(s) 125. For example, each of the one or more skill system(s) 125 may be associated with specific functionality, such that the remote system 120 may identify a first skill system corresponding to the action and may send an instruction to the first skill system to perform the action. The one or more skill system(s) 125 may perform any functionality known to one of skill in the art without departing from the disclosure.

As illustrated in FIG. 1, a smart home skill system(s) 125a may be configured to interact with one or more devices 110 associated with a user profile. For example, the smart home skill system(s) 125a may enable the user 5 to turn on and off smart light switches, smart plugs, and/or the like, to receive temperature information and/or control a thermostat, to monitor security cameras and/or receive event data corresponding to a security system (e.g., data from components of a security system such as cameras, door/window sensors, etc. that are connected to a security system configured to operate with components discussed herein), to receive sensor data and/or event data from a plurality of sensors, and/or the like. Thus, the user 5 may control a smart home environment using the smart home skill system(s) 125a using techniques known to one of skill in the art. In some examples, the smart home skill system(s) 125a may monitor device state information for each of the plurality of devices associated with the user profile.

Some of the other skill system(s) 125 may be configured to perform additional functionality. For example, some of the skill system(s) 125 may be configured to play games or provide other entertainment for the user 5. In some examples, the smart home skill system(s) 125a may be configured to send event data to a first skill system(s) 125b and the first skill system(s) 125b may use the event data as part of performing additional functionality, as described in greater detail below.

While not illustrated in FIG. 1, other skill system(s) 125 may perform similar functionality to the smart home skill system(s) 125a without departing from the disclosure. For example, a security skill system may monitor event data using techniques described below with regard to the smart home skill system(s) 125a without departing from the disclosure. Thus, the smart home skill system(s) 125a is depicted as a conceptual illustration of a skill system(s) 125 configured to generate event data and control access to the event data, but the disclosure is not limited thereto.

At some point, the device 110a may receive audio corresponding to a spoken natural language input originating from the user 5. The device 110a may generate audio data corresponding to the audio and may send the audio data to the remote system 120. Alternatively, the device 110b may receive a typed natural language input from the user 5. The device 110b may generate text data corresponding to the typed input and may send the text data to the remote system 120.

The device 110 may send the audio data and/or the text data to the remote system 120 via a first application that is installed on the device 110 and associated with the remote system 120. An example of such an application is the Amazon Alexa application that may be installed on a smart phone, tablet, or the like.

In some examples, the remote system 120 may determine that the natural language input (e.g., audio data/text data) corresponds to a command to begin a first skill. For example, the natural language input may represent a command to perform a first action using a first skill system 125 associated with the first skill. For ease of illustration, the first skill and the first skill system 125 may be used interchangeably without departing from the disclosure. For example, the first skill may correspond to a skill associated with the first skill system 125, which is a data receiving skill system separate from the remote system 120. To perform the first action, the remote system 120 may send a command to perform the first action to the first skill system 125. In some examples, the remote system 120 may determine that the first action corresponds to event data associated with the smart home skill system(s) 125a. Thus, the remote system 120 may also send a command to the smart home skill system(s) 125a to share event data with the first skill system 125.

While the above description illustrates an example of using the remote system 120 to enable a voice interface for the smart home skill system(s) 125a, the disclosure is not limited thereto. Instead, the smart home skill system(s) 125a may receive a command from any of the devices 110 and/or a personal device (e.g., smart phone) associated with the user 5 without departing from the disclosure. Thus, the system 100 may optionally provide a voice interface for playing a game or other functionality, but the disclosure is not limited thereto and the user 5 may play the game using a graphical interface and/or other techniques known to one of skill in the art without departing from the disclosure.

As illustrated in FIG. 1, the smart home skill system(s) 125a may receive (150) a command to share event data with the first skill. As described above, the smart home skill system(s) 125a may receive the command from the remote system 120 in response to a natural language input from the user 5. However, the disclosure is not limited thereto, and the smart home skill system(s) 125a may receive the command directly from a device 110 without departing from the disclosure. For example, the device 110 may send an input command to the smart home skill system(s) 125a via a second application that is installed on the device 110 and associated with the smart home skill system(s) 125a, although the disclosure is not limited thereto.

The smart home skill system(s) 125*a* may determine (152) first permission data for the first skill and may send (154) the first permission data to the first skill (e.g., first skill system 125). For example, the smart home skill system(s) 125*a* may determine which sensor(s) and/or which device(s) 110 the first skill is granted permission to access, enabling the smart home skill system(s) 125*a* to send event data corresponding to these sensor(s)/device(s) to the first skill system 125.

While not illustrated in FIG. 1, in some examples, the smart home skill system(s) 125*a* and/or the remote system 120 may send a command to perform a first action to the first skill system 125. For example, the first skill system 125 may receive the command to perform the first action and may perform the first action (e.g., send output data to the device 110 indicating that a game is starting and/or rules of the game). If the first skill system 125 already knows the sensor(s)/device(s) 110 to which the first skill system 125 is granted access to, or does not need to know which sensor(s) and/or device(s) 110 the first skill system 125 is granted access to (e.g., processes any event data received), the smart home skill system(s) 125*a* may send the command without sending the first permission data without departing from the disclosure.

For a period of time after starting the first skill, the smart home skill system(s) 125*a* may receive (160) event data from one or more device(s) 110. For example, the devices 110 may generate and/or receive sensor data (e.g., from sensor components and/or devices connected to the device 110) such as motion sensor data, audio data, image data, and/or other input data and may process the sensor data to generate event data, as will be described in greater detail below. In some examples, the devices 110 may send at least a portion of the sensor data to the smart home skill system(s) 125*a*, although the disclosure is not limited thereto.

The smart home skill system(s) 125*a* may then determine (162) whether the first skill is granted permission to access the event data and, if so, may send (164) event data to the first skill (e.g., first skill system 125). For example, the smart home skill system(s) 125*a* may send event data corresponding to a group of devices to which the first skill is granted permission to access, enabling the first skill to provide additional functionality such as an at-home game that involves interactions with the group of devices.

Examples of event data include a motion event (e.g., any movement detected), a user motion event (e.g., an identified user is detected), a button press event (e.g., button receives input), audio detected event (e.g., audio exceeds a threshold), speech detected event (e.g., audio exceeds a threshold and corresponds to speech), a user speech event (e.g., speech is detected that corresponds to an identified user), a location event (e.g., a location of an audio source is determined using audio beamforming, a location of an object is determined using object recognition, and/or the like), an object detected event (e.g., object is detected in image data), a face detected event (e.g., a human face is detected in image data), a user detected event (e.g., an identified user is detected in image data), and/or the like.

To illustrate an example of an at-home game that can be played using the group of devices, a user may initiate a game of hide and seek using an input command and may attempt to hide. For example, the user may initiate the game by generating an utterance (e.g., "Alexa, let's play hide and seek"), pushing a button (e.g., on a device 110 having a touchscreen, an additional device associated with the system 100, and/or the like), inputting a command (e.g., using a smartphone configured with a user interface for the first skill), and/or the like, and after initiating the game the user may hide.

Once the game begins, the system 100 may identify a location of the user using event data. For example, after initiating the game, the devices 110 may detect movement, audio, speech, objects, and/or the like, and may generate sensor data. Based on the sensor data, the system 100 may generate event data and send the event data to the first skill system 125, which may use the event data to determine a location of the user. Once the first skill system 125 determines the location of the user, the first skill system 125 may generate first output data and send the first output data to one or more devices 110 (e.g., "Peekaboo, I see you in the Office!" or "For 10 points, go to the kitchen within 30 seconds"). Alternatively, if the first skill system 125 does not determine the location of the user within a duration of time, the first skill system 125 may generate second output data and send the second output data to one or more devices 110 (e.g., "Come out, come out, wherever you are!").

In addition to sending event data to a skill system(s) 125 to enable a game or performing other functionality, in some examples the system 100 may send event data to the remote system 120 in response to a user utterance. For example, the system 100 may enable a voice interface such that the user 5 may request information about event data and receive a system response indicating the requested information, although the disclosure is not limited thereto. To illustrate an example, the user may input an utterance (e.g., "Tell me what events have happened in the last ten minutes") and the system 100 may generate a system response (e.g., "A hallway sensor detected motion 20 times in the last ten minutes").

While the following description refers to playing games or other functionality, the disclosure is not limited thereto and the system 100 may provide additional functionality to assist the user 5. For example, the user 5 may ask the system 100 where a child or pet is currently located in a smart home environment and the system 100 may determine a location based on the event data. Additionally or alternatively, a skill system(s) 125 may be configured to monitor motion or other event data and send a notification if no motion is detected within a duration of time. For example, a user 5 may monitor an elderly family member remotely using the system 100. Thus, if the system 100 does not detect motion within the duration of time (e.g., hour, several hours, etc.), the system 100 may send a notification alerting the user 5 that no motion has been detected.

Figure 2:
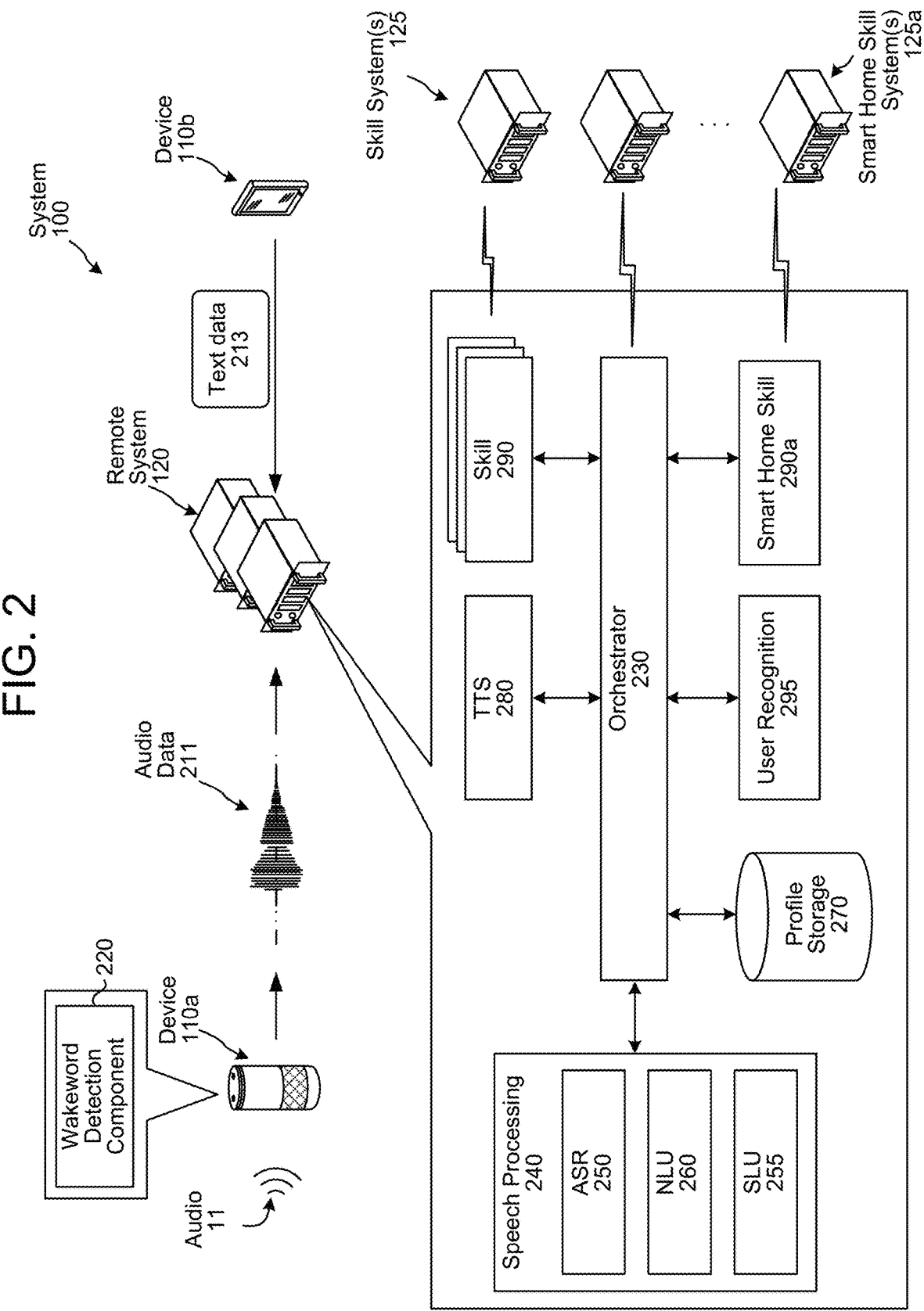
FIG. 2 is a conceptual diagram of components of the system.

The system 100 may operate using various components as described in FIG. 2. The various components may be located on a same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the remote system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 211, representing the audio 11, to the remote system 120. The audio data 211 may include data corresponding to the detected wakeword, or the device 110a may remove the portion of the audio corresponding to the detected wakeword prior to sending the audio data 211 to the remote system 120.

The remote system 120 may include an orchestrator component 230 configured to receive the audio data 211 (and optionally and assistant identifier) from the device 110a. The orchestrator component 230 may send the audio data 211 to a speech processing component 240. In some examples, the speech processing component 240 may include an ASR component 250 and an NLU component 260 that are configured to process the audio data 211 to generate NLU data. However, the disclosure is not limited thereto and in other examples, the speech processing component 240 may include a spoken language understanding (SLU) component 255 that is configured to process the audio data 211 to generate the NLU data. Additionally or alternatively, the speech processing component 240 may include the ASR component 250, the NLU component 260 and/or the SLU component 255 without departing from the disclosure.

The ASR component 250 transcribes the audio data 211 into ASR results data (e.g., text data) include one or more ASR hypotheses (e.g., in the form of an N-best list). Each ASR hypothesis may represent a different likely interpretation of the speech in the audio data 211. Each ASR hypothesis may be associated with a score representing a confidence of ASR processing performed to generate the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

The device 110b may receive a typed natural language input. The device 110b may generate text data 213 representing the typed natural language input. The device 110b may send the text data 213 to the remote system 120, wherein the text data 213 is received by the orchestrator component 230.

The orchestrator component 230 may send text data (e.g., text data output by the ASR component 250 or the received text data 213) to an NLU component 260.

The orchestrator component 230 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device (110a/110b), the remote system 120, a skill system 125, etc.) to execute the intent. For example, if the text data corresponds to "play Adele music," the NLU component 260 may determine a <PlayMusic> intent and may identify "Adele" as an artist. For further example, if the text data corresponds to "what is the weather," the NLU component 260 may determine an <OutputWeather> intent. In another example, if the text data corresponds to "turn off the lights," the NLU component 260 may determine a <DeactivateLight> intent.

The NLU component 260 may output NLU results data (which may include tagged text data, indicators of intent, etc.) to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

As described above, the remote system 120 may perform speech processing using two different components (e.g., the ASR component 250 and the NLU component 260). One skilled in the art will appreciate that the remote system 120, in at least some examples, may implement a spoken language understanding (SLU) component 255 that is configured to process audio data 211 to generate NLU results data without departing from the disclosure.

In some examples, the SLU component 255 may be equivalent to the ASR component 250 and the NLU component 260. While the SLU component 255 may be equivalent to a combination of the ASR component 250 and the NLU component 260, the SLU component 255 may process audio data 211 and directly generate the NLU results data, without an intermediate step of generating text data (as does the ASR component 250). As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. In some examples, the SLU component 255 outputs a most likely NLU hypothesis, or multiple NLU hypotheses in the form of a lattice or an N-best list with individual NLU hypotheses corresponding to confidence scores or other scores (such as probability scores, etc.).

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or skill system(s) 125 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill system(s) 125. The skill system(s) 125 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill system(s) 125 may provide output text data responsive to the present user command.

The remote system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

As illustrated in FIG. 2, the system 100 may include a smart home skill 290a that is associated with a smart home skill system(s) 125a. For ease of explanation, the following description may refer to the smart home skill 290a and/or the smart home skill system(s) 125a interchangeably to describe specific functionality. However, the smart home skill 290a is associated with the remote system 120 and therefore involves natural language processing performed by the remote system 120, whereas the smart home skill system(s) 125a may be configured to perform actions using any interface, including a graphical interface with a user device 110 (e.g., smart phone).

The smart home skill system(s) 125a may be configured to receive event data from the devices 110 and track the event data. For example, as will be described in greater detail below with regard to FIGS. 11A-11B, the smart home skill system(s) 125a may receive event data from one or more devices 110. For example, a first device 110 may generate event data using sensor data generated by sensor(s) associated with the first device 110 and may send the event data to the smart home skill system(s) 125a. The event data may correspond to a variety of different types of events, and the smart home skill system(s) 125a may store/manage the event data to keep track of the state of all of the devices 110 and/or events detected by the devices 110. The smart home skill system(s) 125a may provide the event data, or a subset of the event data, to other components that have permission to access the event data without departing from the disclosure.

The remote system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The remote system 120 may include a user recognition component 295. In at least some examples, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition (e.g., user recognition processing) by comparing speech characteristics, in the audio data 211, to stored speech characteristics of users. The user recognition component 295 may additionally or alternatively perform user recognition by comparing biometric data (e.g., fingerprint data, iris data, etc.), received by the remote system 120 in correlation with a natural language input, to stored biometric data of users. The user recognition component 295 may additionally or alternatively perform user recognition by comparing image data (e.g., including a representation of at least a feature of a user), received by the remote system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the remote system 120 and/or other systems.

The remote system 120 may include profile storage 270. The profile storage 270 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 270 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 3:
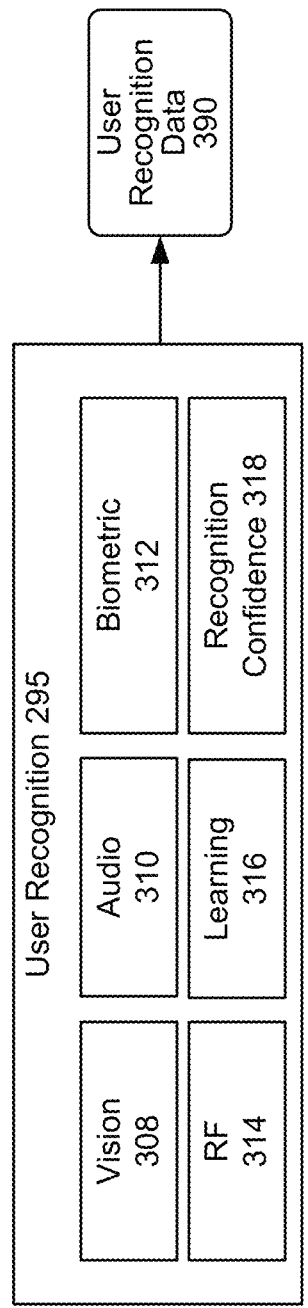
FIG. 3 is a schematic diagram of an illustrative architecture in which sensor data is combined to recognize one or more users.

FIG. 3 is a schematic diagram of an illustrative architecture in which sensor data is combined to recognize one or more users, in accordance with embodiments of the present disclosure. As described above, the remote system 120 may include a user recognition component 295. The user recognition component 295 may recognize one or more users using a variety of data. However, the disclosure is not limited thereto, and the user recognition component 295 may be included within an individual device 110 without departing from the disclosure. Thus, the device(s) 110 and/or the remote system 120 may perform user recognition processing without departing from the disclosure.

As illustrated in FIG. 3, the user recognition component 295 may include one or more subcomponents including a vision component 308, an audio component 310, a biometric component 312, a radio frequency (RF) component 314, a learning component 316, and a recognition confidence component 318. In some instances, the user recognition component 295 may monitor data and determinations from one or more subcomponents to recognize an identity of one or more users associated with data input to the remote system 120. The user recognition component 295 may output user recognition data 390, which may include a user identifier associated with a user the user recognition component 295 believes originated data input to the remote system 120. The user recognition component 295 may be used to inform processes performed by various components of the remote system 120 as described herein.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may use determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the remote system 120.

The overall system of the present disclosure may include biometric sensors that transmit data to the biometric component 312. For example, the biometric component 312 may receive data corresponding to fingerprints, iris or retina scans, thermal scans, weights of users, a size of a user, pressure (e.g., within floor sensors), etc., and may determine a biometric profile corresponding to a user. The biometric component 312 may distinguish between a user and sound from a television, for example. Thus, the biometric component 312 may incorporate biometric information into a confidence level for determining an identity of a user. Biometric information output by the biometric component 312 can be associated with specific user profile data such that the biometric information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge the user's personal device (such as a phone) to the device 110. In this manner, the user may "register" with the remote system 120 for purposes of the remote system 120 determining who spoke a particular input. Such a registration may occur prior to, during, or after speaking of an input.

The learning component 316 may track the behavior of various users as a factor in determining a confidence level of the identity of the user. By way of example, a user may adhere to a regular schedule such that the user is at a first location during the day (e.g., at work or at school). In this example, the learning component 316 would factor in past behavior and/or trends in determining the identity of the user that provided input to the remote system 120. Thus, the learning component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the remote system 120 may be configured at a computing device (e.g., a local server). Thus, in some instances, the audio component 310 operating on a computing device may analyze all sound to facilitate recognition of a user. In some instances, the audio component 310 may perform voice recognition (e.g., voice recognition processing) to determine an identity of a user.

The audio component 310 may also perform user identification based on audio data 211 input into the remote system 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

Figure 4:
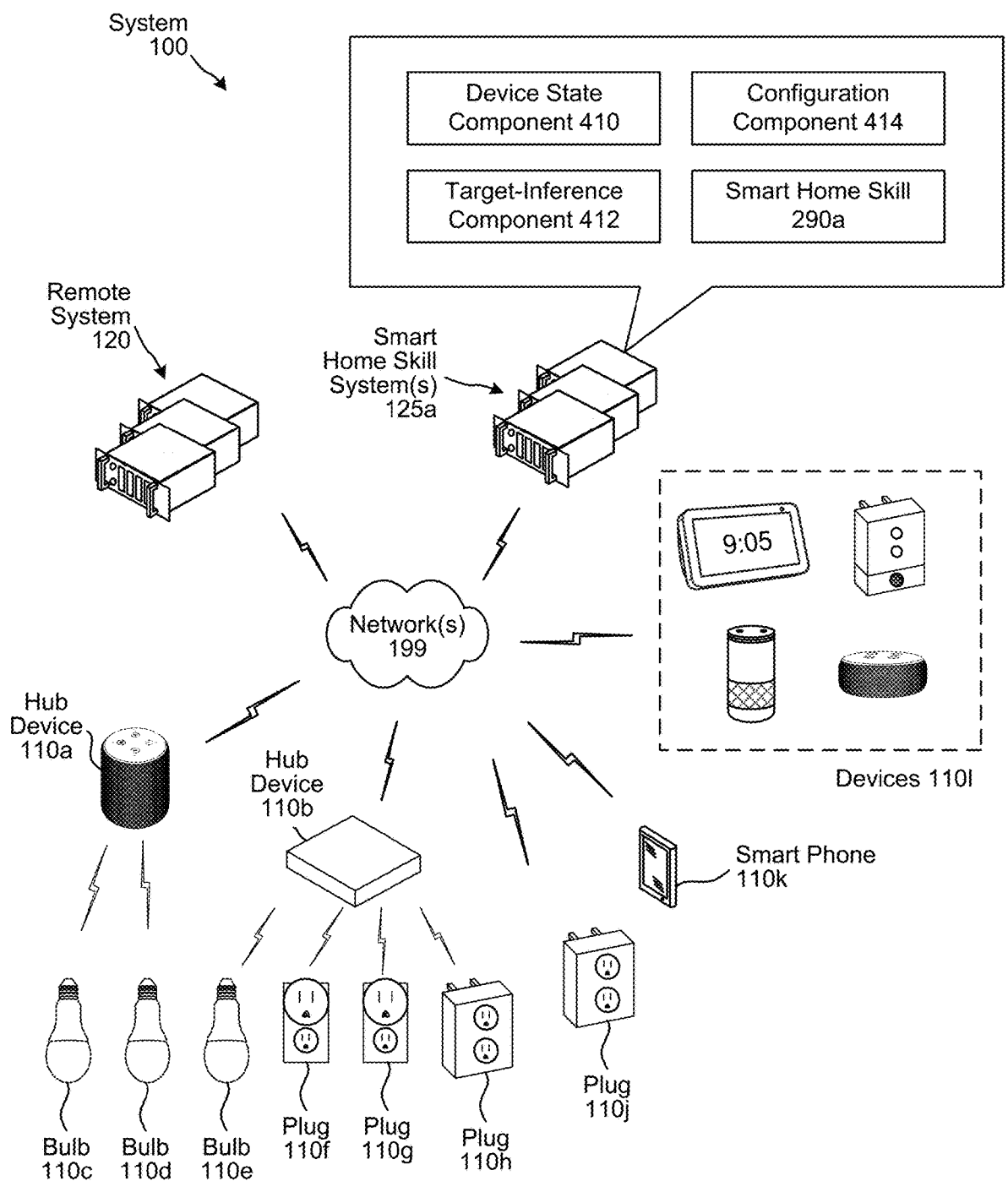
FIG. 4 illustrates a schematic diagram of an example system for a smart home environment.

FIG. 4 illustrates a schematic diagram of an example system for a smart home environment. As illustrated in FIG. 4, the system 100 may include the smart home skill system(s) 125a configured to monitor device state data and/or event data associated with a plurality of devices 110. For example, the smart home skill system(s) 125a may receive device state data from and/or send commands to each of the plurality of devices 110, enabling the smart home skill system(s) 125a to remotely control and/or monitor the plurality of devices 110 in a smart home environment. Additionally or alternatively, the smart home skill system(s) 125a may receive event data generated by the plurality of devices 110, enabling the smart home skill system(s) 125a to track activity detected by sensors connected to the plurality of devices 110.

In some examples, the system 100 may include the remote system 120 configured to enable a voice interface and interpret voice commands, although the disclosure is not limited thereto. For example, some of the devices 110 may be voice-enabled and configured to receive user utterances and perform operations in response to such user utterances. In these examples, the voice-enabled devices 110 may be "hands free" such that interactions with the devices are performed through audible requests and responses.

As illustrated in FIG. 4, some of the devices 110 (e.g., smart phone 110k, devices 110l, and smart plug 110j) may be configured to communicate with the smart home skill system(s) 125a directly via the network(s) 199, while other devices 110 (e.g., 110c-110h) may be configured to communicate with the smart home skill system(s) 125a indirectly via hub devices 110a-110b. For example, the smart plug 110j may send data to the smart home skill system(s) 125a via the network(s) 199, whereas the smart plug 110h may send data to a second hub device 110b and the second hub device 110b may send the data to the smart home skill system(s) 125a via the network(s) 199.

The system 100 may also include hub devices 110a-110b. A hub device may be referred to as a "home controller," gateway and/or other type of "hub," and may assist in controlling associated smart-home devices. In some examples, smart devices may be paired to the hub device, typically by following instructions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device. As illustrated in FIG. 4, the first hub device 110a may correspond to a device 110 that is configured to interpret voice commands and perform other functionality while also connecting to one or more devices (e.g., smart bulbs 110c-110d). In contrast, the second hub device 110b may be configured specifically to connect to one or more devices (e.g., smart bulb 110e, smart plug 110f, smart plug 110g, smart plug 110h, etc.) without performing additional functionality without departing from the disclosure.

While FIG. 4 illustrates the hub devices 110a-110b connecting to smart bulbs 110c-110e and smart plugs 110f-110h, the disclosure is not limited thereto and the hub devices 110a-110b may connect to any number of devices 110 without departing from the disclosure.

While not illustrated in FIG. 4, any of the devices 110 may be configured to connect to sensor components that are external to the devices 110, using a wireless connection and/or a wired connection, without departing from the disclosure. Additionally or alternatively, while the smart bulbs 110c-110e and/or the smart plugs 110f-110j may not include a traditional sensor component, these devices 110c-110j may determine a current state (e.g., "ON" or "OFF") and the current state may be considered sensor data without departing from the disclosure. For example, the system 100 may detect that the smart bulb 110c switches from a first state (e.g., "OFF") to a second state (e.g., "ON") and use that information to generate event data without departing from the disclosure.

The devices 110 that connect to the hub devices 110a-110b may be described as "smart" devices, which may have certain computing components and be configured to send and/or receive data from other devices. For example, these smart devices may correspond to light bulbs, plugs, locks, televisions, appliances, doorbells, cameras, etc. These devices 110 may be "paired" or otherwise associated with a voice-enabled device (e.g., devices 110l), a hub device (e.g., hub devices 110a-110b), and/or a user account, although the disclosure is not limited thereto.

The devices 110 may be configured to send data to and/or receive data from the remote system 120 and/or the smart home skill system(s) 125a via the network 199. As discussed above, one or more of the components of the system 100 may communicate directly with the remote system 120 and/or the smart home skill system(s) 125a via the network 112. However, the disclosure is not limited thereto, and one or more the components of the system 100 may communicate indirectly with the remote system 120 and/or the smart home skill system(s) 125a via another device 110, such as the hub devices 110a-110b. Additionally or alternatively, a personal device, such as a smart phone 110k, may communicate directly with the devices 110 and/or the remote system 120 and/or the smart home skill system(s) 125a without departing from the disclosure.

The devices 110 may include one or more components, such as, for example, one or more microphones, one or more speakers, one or more displays, one or more cameras, and/or sensor components (e.g., motion sensor, proximity sensor, etc.). The microphones may be configured to capture audio, such as user utterances, and generate corresponding audio data. The speakers may be configured to output audio, such as audio corresponding to audio data received from another device 110, the remote system 120, and/or the smart home skill system(s) 125a. The displays may be configured to present images, such as images corresponding to image data received from another device 110, the remote system 120 and/or the smart home skill system(s) 125a.

In some examples, the devices 110 may be configured to activate and/or deactivate device functionality components. For example, the smart bulb 110c may be a light bulb, and in this example, the device functionality components may include a filament and/or light emitting diode that may produce and/or emit light. Additionally or alternatively, the smart plug 110f may be a wall plug, and in this example, the device functionality components may include an "on/off mechanism" for causing electricity to flow or not flow to a device that is plugged in to the wall plug. It should be noted that the device functionality components illustrated here are by way of example only and the disclosure is not limited thereto.

The personal device (e.g., smart phone 110k) may include one or more components such as one or more applications residing on memory of the personal device and/or residing elsewhere. The applications may be configured to cause processors of the personal device to display one or more user interfaces associated with operations of the devices 110. The user interfaces may be utilized to receive inputs from the user of the personal device and/or to provide content to the user.

As described in greater detail above, the remote system 120 may include an automatic speech recognition (ASR) component, a natural language understanding (NLU) component, a text-to-speech (TTS) component, and/or the like. Thus, the remote system 120 may be configured to enable a voice interface and perform additional functionality without departing from the disclosure.

The smart home skill system(s) 125a may include a device state component 410, a target-inference component 412, a configuration component 414, and/or a smart home skill 290a. Each of the components described herein with respect to the smart home skill system(s) 125a may be associated with their own systems, which collectively may be referred to herein as the smart home skill system(s) 125a, and/or some or all of the components may be associated with a single system.

The device state component 410 may be configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill system(s) 125a and stored by the device state component 410.

The target-inference component 412 may be configured to determine which of the plurality of devices 110 to operate based at least in part on receiving audio data representing a user utterance from a user 5. For example, a user 5 may speak a user utterance to perform functionality and corresponding audio may be captured by the microphones of one of the devices 110. The device 110 may generate audio data representing the user utterance and may send the audio data to the remote system 120 for speech processing. In some examples, the remote system 120 may attempt to determine which device 110 to operate in light of the user utterance. For example, the user utterance may include "turn on study light." The ASR component 250 may generate text data corresponding to the audio data and the NLU component 260 may generate intent data indicating that the user utterance is associated with a "turn on" intent and that the device to be acted on has a naming indicator of "study light." In these examples, the smart home skill system(s) 125a may be designated as a component that may handle and/or otherwise perform operations corresponding to a "turn on" intent. The remote system 120 may communicate the intent data and/or other data to the smart home skill system(s) 125a using the smart home skill 290a. The smart home skill 290a may attempt to identify the device 110 to be operated using the data received from the remote system 120 and/or from one or more other components, such as an internet-of-things component.

The user 5, the remote system 120, the smart home skill system(s) 125a, and/or a third-party system may have given naming indicators to the devices 110 associated with the user profile associated with the user 5. However, in this example, none of the naming indicators may be "study light" and/or multiple naming indicators may correspond to "study light." Therefore, the target-inference component 412 of the smart home skill system(s) 125a may perform target inference operations to identify which of the multiple devices 110 is most likely to be the "study light." The target inference operations may include determining which device is most likely in the "on" state at the time the audio data was received by the remote system 120. For example, the target-inference component 412 may determine that 1% of the devices 110 associated with a first device with the naming indicator of "kitchen light" are in the "unlocked" state. The target-inference component 412 may further determine that 50% of the devices 110 associated with a second device with the naming indicator of "bedroom light" are in the "unlocked" state. The target-inference component 412 may further determine that 97% of the devices 110 associated with a third device with the naming indicator of "office light" are in the "on" state. Based at least in part on this analysis, the target-inference component 412 may determine that the third device is most likely the device that the user desires to operate.

Additionally or alternatively, the state prediction operations described herein may be utilized when configuring a device 110 for scheduled state changes. For example, a user 5 may desire to set a schedule for a device 110 to be activated and deactivated during, for example, a given day. While the user 5 may manually set such a schedule, the user 5 may additionally, or alternatively, desire to automatically set a schedule based on typical usage patterns for devices like the selected device. To do so, the configuration component 414 may determine when state changes generally occur for a subset of the devices 110 that are similar to the selected device. Scheduling data indicating the schedule of such state changes may be generated and a recommendation indicating the schedule may be sent to the device 110 and/or the personal device associated with the user 5 to configure the selected device for scheduled state changes utilizing the schedule. Based at least in part on receiving input data representing an acceptance of the recommendation, the configuration component 414 may configure the selected device using the schedule.

Additionally, or alternatively, the state prediction operations described herein may be utilized to determine which devices to transition states at a given time and/or in response to a user request. For example, a user may speak a "good night" or "good morning" user utterance to one of the device 110 configured to be voice enabled. In other examples, the user may provide input to a personal device (e.g., smart phone 110k) that corresponds to a "good night" or "good morning" request. In these examples, the user utterance may be associated with an intent to operate one or more devices 110 that a user would typically operate when they are going to bed and/or getting up for the morning. For example, when going to bed, the user 5 may desire to lock the doors, turn off certain lights, turn on other lights, adjust thermostat temperatures, etc. The state prediction operations described herein may be utilized to determine which of the devices 110 to operate when a user command such as those described with respect to these examples is received.

Additionally, or alternatively, the state prediction operations described herein may be utilized to determine which devices 110 to operate and/or not operate when a user is not present in a space with the devices 110. For example, the remote system 120, the smart home skill system(s) 125a, and/or the device 110 may determine that a user is not present in the space. This determination may be made, for example, by determining that audio has not been received at the microphones of the device 110 and/or audio is received below a threshold amount and/or a threshold intensity. Additionally, or alternatively, the determination may be made based at least in part on image data representing one or more images of the space not depicting a user. Additionally, or alternatively, the determination may be made based at least in part on a signal not being received from a personal device (e.g., smart phone 110k) associated with the user. In examples where it is determined that a user is not present in the space, devices 110 may be activated based at least in part on their predicted state. Additionally, or alternatively, devices 110 may restricted from activation during this time period, which may prevent such devices from being activated when not desired.

The smart home skill 290a described herein may include a speech-enabled web component that may run in the remote system 120 and/or the smart home skill system(s) 125a. Skill(s) may receive and respond to user-initiated requests. Skill(s) may define life-cycle events for a skill as experienced by a user, a way to process requests from the user, and/or call-backs from events happening on the device the user is interacting with. Given skill(s) may be capable of handling certain intents. For example, the NLU component 260 may generate intent data that indicates an intent as well as a payload associated with the intent. A skill may be associated with the intent, and thus the intent data, including the payload may be sent to and received by the skill. The skill may process that intent by analyzing the payload and generating data representing a directive and/or instruction to perform an action. The directive and/or instruction may be sent to other components of the system for performance of the action.

After processing a user request and generating the directive, the remote system 120 and/or the smart home skill system(s) 125a may publish (i.e., write) some or all of this information to an event bus. That is, the remote system and/or the smart home skill system(s) 125a may provide information regarding the initial request (e.g., the speech, the text, the domain/intent, etc.), the response to be provided to a device 110, or any other information pertinent to the interaction between the device 110 and the remote system 120 and/or the smart home skill system(s) 125a to the event bus.

Within the remote system 120 and/or the smart home skill system(s) 125a, one or more components or services may subscribe to the event bus so as to receive information regarding interactions between the devices 110 and the user 5. For example, the smart home skill system(s) 125a may subscribe to the event bus and, thus, may monitor information regarding these interactions. In some examples, monitoring information in the event bus may comprise messages between various components of the remote system 120 and/or the smart home skill system(s) 125a. For example, the device state component 410 may monitor the event bus to identify device state data for the devices 110. In some examples, the event bus may "push" or send indications of events and/or device state data to one or more components and/or devices 110. For example, the event bus may send indications of events and/or device state data to the smart phone 110k and/or the smart home skill system(s) 125a. Additionally, or alternatively, the event bus may be "pulled" where a component sends requests to the event bus to provide an indication of device state data for a particular device 110.

The event bus may store indications of the device states for the devices, such as in a database (e.g., profile storage 270, event database associated with the smart home skill system(s) 125a, etc.), and using the stored indications of the device states, send the device state data for the devices 110 to the remote system 120 and/or the smart home skill system(s) 125a. Thus, to identify device state data for a device 110, a component may send a request to the event bus (e.g., event component) to provide an indication of the device state data associated with a device 110, and receive, from the event bus, the device state data that was requested.

In some examples, the remote system 120 and/or the smart home skill system(s) 125a may monitor information published to the event bus and identify events that may trigger action. For instance, the remote system 120 and/or the smart home skill system(s) 125a may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The remote system 120 and/or the smart home skill system(s) 125a may reference a user registry to determine which voice-enabled devices are associated with secondary devices, as well as determine device types, states, and other capabilities of these secondary devices. For instance, the remote system 120 and/or the smart home skill system(s) 125a may determine, from the information published to the event bus, an identifier associated with the voice-enabled device making the corresponding request or the voice-enabled device selected to respond to or act upon the user utterance. The remote system 120 and/or the smart home skill system(s) 125a may use this identifier to identify, from the user registry, a user profile associated with the voice-enabled device and/or determine whether any secondary devices have been registered with the identified user profile, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The remote system 120 and/or the smart home skill system(s) 125*a* may determine whether a particular event identified is associated with supplemental content. That is, the remote system 120 and/or the smart home skill system(s) 125*a* may write, to a datastore, indications of which types of events and/or which primary content or responses are associated with supplemental content. In some instances, the remote system 120 and/or the smart home skill system(s) 125*a* may provide access to third-party developers to allow the developers to register supplemental content for output on secondary devices for particular events and/or primary content. For example, if a voice-enabled device is to output that the weather will include thunder and lightning, the remote system 120 and/or the smart home skill system(s) 125*a* may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the remote system 120 and/or the smart home skill system(s) 125*a* may store an association between the primary response or content (e.g., outputting of information regarding the world's largest mammal) and corresponding supplemental content (e.g., the audio data, image data, or the like). In some instances, the remote system 120 and/or the smart home skill system(s) 125*a* may also indicate which types of secondary devices are to output which supplemental content. For example, the remote system 120 and/or the smart home skill system(s) 125*a* may store an indication that secondary devices of a class type "tablet" are to output a picture of a blue whale. In these and other instances, meanwhile, the remote system 120 and/or the smart home skill system(s) 125*a* may store the supplemental content in association with secondary-device capabilities (e.g., devices with speakers output the audio commentary, devices with screens output the image, etc.).

The remote system 120 and/or the smart home skill system(s) 125*a* may also determine how to transmit response and/or supplement content (and/or information acquiring the content) to the devices 110 (e.g., voice-enabled devices and/or the secondary devices). To make this determination, the remote system 120 and/or the smart home skill system(s) 125*a* may determine a device type of the voice-enabled devices and/or secondary devices, capabilities of the device(s), or the like, potentially as stored in the user registry. In some instances, the remote system 120 and/or the smart home skill system(s) 125*a* may determine that a particular device is able to communicate directly and may provide the response and/or content directly over the network(s) 199 to the secondary device (potentially via the remote system 120). In another example, the remote system 120 and/or the smart home skill system(s) 125*a* may determine that a particular secondary device is unable to communicate directly with the remote system 120 and/or the smart home skill system(s) 125*a*, but instead is configured to communicate with a hub device 110*a*-110*b* in its space over short-range wireless networks. As such, the remote system 120 and/or the smart home skill system(s) 125*a* may send the supplement content (or information) to the hub device 110*a*/110*b*, which may send the information over a short-range network to the secondary device.

The remote system 120 and/or the smart home skill system(s) 125*a* may include the user registry (e.g., profile storage 270, database associated with the smart home skill system(s) 125*a*, etc.) that includes data regarding user profiles as described herein. The user registry may be located part of, or proximate to, the remote system 120 and/or the smart home skill system(s) 125*a*, although the disclosure is not limited thereto and the user registry may be separate and may communicate with the remote system 120 and/or the smart home skill system(s) 125*a* via the network(s) 199 without departing from the disclosure.

The user registry may include a variety of information related to individual users, user profiles, accounts, etc. that interact with the devices 110, the remote system 120, and/or the smart home skill system(s) 125*a*. For example, the user registry may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry may store indications of associations between various devices 110 (e.g., between voice-enabled devices and/or secondary device), such as virtual clusters of devices, states of devices, and associations between devices and audio-session queues. The user registry may represent clusters of devices as single devices that can receive commands and disperse the commands to each device and/or to the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the smart home skill 290*a* and/or other skills 290 may determine, based on the stored device states in the user registry, a current device state of the devices 110. Rather than receiving device states for the voice-enabled devices, in metadata, the device states may already have been determined or received and stored in the user registry. Further, the user registry may provide indications of various permission levels depending on the user. As an example, the remote system 120 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus may publish different events which indicate device states to various entities or components that subscribe to the event bus. For instance, if an event of "turn on office lights" occurs for a voice-enabled device, the event bus may publish the indication of this event, and thus the device state of the voice-enabled device from which the audio data was received may be determined. Thus, various components may be provided with indications of the various device states via the event bus. The event bus may further store and/or update device states for the devices 110 in the user registry. The components of the remote system 120 and/or the smart home skill system(s) 125*a* may query the user registry to determine device states.

A particular user profile may include a variety of data that may be used by the remote system 120 and/or the smart home skill system(s) 125*a*. For example, a user profile may include information about what device(s) 110 are associated with the user and/or user profile. The user profile may further indicate an IP address for each of the devices 110 associated with the user and/or user profile, user IDs for the devices 110, indications of the types of devices, and current device states for the devices.

The user registry component may be configured to identify, determine, and/or generate associations between users, user accounts, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between the devices 110. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores may be configured to identify, determine, and/or generate data associated with use of the devices 110. Usage data may be identified, determined, and/or generated that indicates some or each of these interactions. Timing data may also be identified, determined, and/or generated that indicates a time at which some or each of these interactions took place. Device-state data, and/or other usage data may also be identified, determined, and/or generated. In some examples, the user registry and the data stores may be separate components, although the disclosure is not limited thereto and in other examples the user registry and the data stores may be a single component. In other examples, the data stores may be operated and/or maintained by a third-party system other than the remote system 120 and/or the smart home skill system(s) 125*a*, and the remote system 120 and/or the smart home skill system(s) 125*a* may have access to the data stores.

FIG. 5 illustrates a conceptual diagram of devices and data utilized in a smart home environment. As illustrated in FIG. 5, some devices (e.g., hub devices 110*a*-110*b* and/or devices 110*m*-110*p*) may communicate directly with the smart home skill system(s) 125*a*, while other devices 110 (e.g., devices 110*c*-110*h*) may communicate with the smart home skill system(s) 125*a* indirectly via hub devices 110*a*/110*b*. For example, the hub devices 110*a*-110*b* and/or the devices 110*m*-110*p* may send state data 510 to the smart home skill system(s) 125*a* via the network(s) 199, while the devices 110*c*-110*h* may send state data 510 to the hub devices 110*a*/110*b* and then the hub devices 110*a*/110*b* may send the state data 510 to the smart home skill system(s) 125*a*.

As described above, the smart home skill system(s) 125*a* may include a device state component 410 configured to monitor a device state for each of the individual devices 110. For example, a device 110 may undergo state changes, such as being turned on and off. Additionally or alternatively, the device 110 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill system(s) 125*a* and stored by the device state component 410.

In some examples, the smart home skill system(s) 125*a* may store information about the device and/or the device state in a device registry 520. For example, the device registry 520 may be configured to store the state data as well as identifying information associated with each of the devices 110, although the disclosure is not limited thereto.

FIG. 6 illustrates an example of information included in a device registry. As illustrated in FIG. 6, the device registry 520 may include an entry for each of the devices 110 associated with an account. In the example illustrated in FIG. 6, each entry may indicate a customer profile (e.g., customer identification), which may correspond to a user profile (e.g., individual user) or the overall account, device identification (ID) (e.g., unique device identifier), an Internet Protocol (IP) address associated with the device, a device name, one or more qualifiers (e.g., indicating a location or other attributes of the device), a device state (e.g., outputting audio, idle, etc.), and/or the like. However, the disclosure is not limited thereto and the device registry 520 may include any information known to one of skill in the art without departing from the disclosure.

While the device registry 520 may include multiple columns of information, an individual entry in the device registry 520 may lack information for one or more columns of information without departing from the disclosure. To illustrate an example, some devices may not be associated with an IP address without departing from the disclosure. For example, one or more devices (e.g., sensor device or component, although the disclosure is not limited thereto) may connect to the remote system 120 via a wireless connection to a hub device or a wired connection to another device 110 and may therefore not be associated with an individual IP address. Additionally or alternatively, the device registry 520 may indicate the IP address of the hub device for each of the one or more devices without departing from the disclosure.

Figure 7:
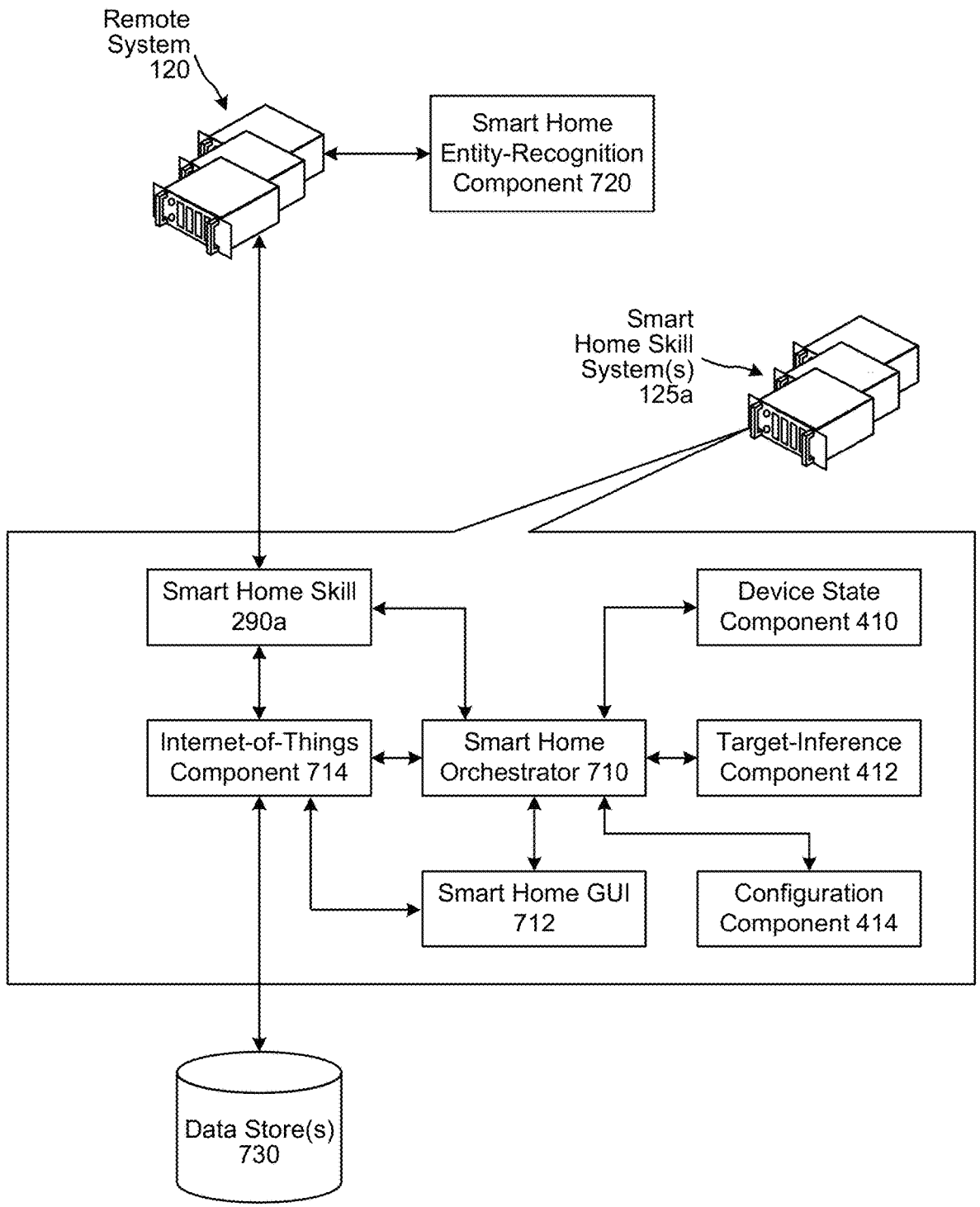
FIG. 7 illustrates a conceptual diagram of a smart-home system.

FIG. 7 illustrates a conceptual diagram of a smart-home system. The smart home skill system(s) 125*a* may include components described above with respect to FIG. 4, such as a smart home skill 290*a*, a device state component 410, a target-inference component 412, and a configuration component 414. As illustrated in FIG. 7, the smart home skill system(s) 125*a* may also include components such as a smart home orchestrator 710, a smart home graphical user interface (GUI) component 712, and/or an internet-of-things component 714. Each of these components will be described in detail below. The smart home skill system(s) 125*a* may also be configured to send data to and receive data from other components of the system 100, such as the remote system 120 and/or data store(s) 730.

As described herein, a user may interact with a device using tactile input to the device, voice input to a voice-enabled device, input to an application residing on and/or accessible to a personal device, and/or the like. When a user interacts with a device using voice input to a voice-enabled device, audio data representing user utterances may be received at the remote system 120 and the remote system 120 may analyze the audio data and/or corresponding text data generated, by way of example, using an ASR component, to determine that the user utterance represents an intent to control an accessory device. To determine the intent associated with the user utterance, the remote system 120 may utilize a smart-home entity-recognition component 720, which may be utilized to inform one or more intents available to the remote system 120 and/or to inform one or more values associated with the intents. For example, the user utterance of "turn off bedroom lights" may be analyzed by the remote system 120. The smart-home entity-recognition component 720 may train or otherwise provide data to the remote system 120 indicating intents associated with operation of the devices 110, such as "turn on," "turn off" "activate," "deactivate," "dim," "brighten," "lock," "unlock," etc. The smart-home entity-recognition component 720 may additionally, or alternatively, provide data indicating identifiers and/or payloads associated with such intents, such as "light," "lights," "lock," "outlet," "switch," etc.

It should be understood that while the smart-home entity-recognition component 720 is depicted in FIG. 7 as being a component separate from the smart home skill system(s) 125*a*, the smart-home entity-recognition component 720 may be a component of the smart home skill system(s) 125*a* without departing from the disclosure. Additionally or alternatively, while FIG. 7 illustrates the smart-home entity-recognition component 720 as being a component separate from the remote system 120, the smart-home entity-recognition component 720 may be a component of the remote system 120 without departing from the disclosure.

The remote system 120 may be configured to determine that the intent corresponds to an operation configured to be performed by the smart home skill system(s) 125*a*, and based at least in part on such a determination, the remote system 120 may provide the intent data and/or other data associated with the request to the smart home skill 290*a* of the smart home skill system(s) 125*a*. The smart home orchestrator 710 may be configured to receive data indicating that the smart home skill 290*a* has been invoked to determine a directive to be performed with respect to a device 110 and may query one or more other components of the smart home skill system(s) 125*a* to effectuate the request. For example, the smart home orchestrator 710 may query the internet-of-things component 712 to identify naming indicators associated with devices 110 for a particular user account. The internet-of-things component 714 may query the data store(s) 730 and/or the user account for such naming indicators. The internet-of-things component 714 may return the naming indicators to the smart home skill 290*a*, which may identify which naming indicator corresponds to the identified target device from the user utterance.

Additionally, or alternatively, as mentioned above, the devices 110 may be operated based at least in part on input data received from an application residing on and/or accessible to a personal device, such as a mobile phone and/or computer. The smart-home GUI component 712 may be utilized to receive the input data and/or to display recommendations to a user. For example, the smart-home GUI component 712 may be utilized to display recommendations for the changing of device states such as when the system determines that a target device is operating in a state that differs from the state predicted for the device at a given time. By way of continued example, the smart-home GUI component 712 may be utilized to display recommendations for scheduling state transitions for a device, such as when the device is in a given mode, such as an "away mode."

The data store(s) 730 may be configured to identify, determine, and/or generate data associated with use of the devices 110. For example, some of the devices 110 may be utilized to cause other devices 110 to operate. Usage data may be identified, determined, and/or generated that indicates some or each of these interactions. Timing data may also be identified, determined, and/or generated that indicates a time at which some or each of these interactions took place. Device state data, and/or other usage data may also be identified, determined, and/or generated. It should be understood that while the data store(s) 730 is illustrated as a separate component, the data store(s) 730 may be included within the remote system 120 and/or the smart home skill system(s) 125*a*. In other examples, the data store(s) 730 may be operated and/or maintained by a third-party system other than the remote system 120 and/or the smart home skill system(s) 125*a*, and the remote system 120 and/or the smart home skill system(s) 125*a* may have access to the data store(s) 730.

Figure 8:
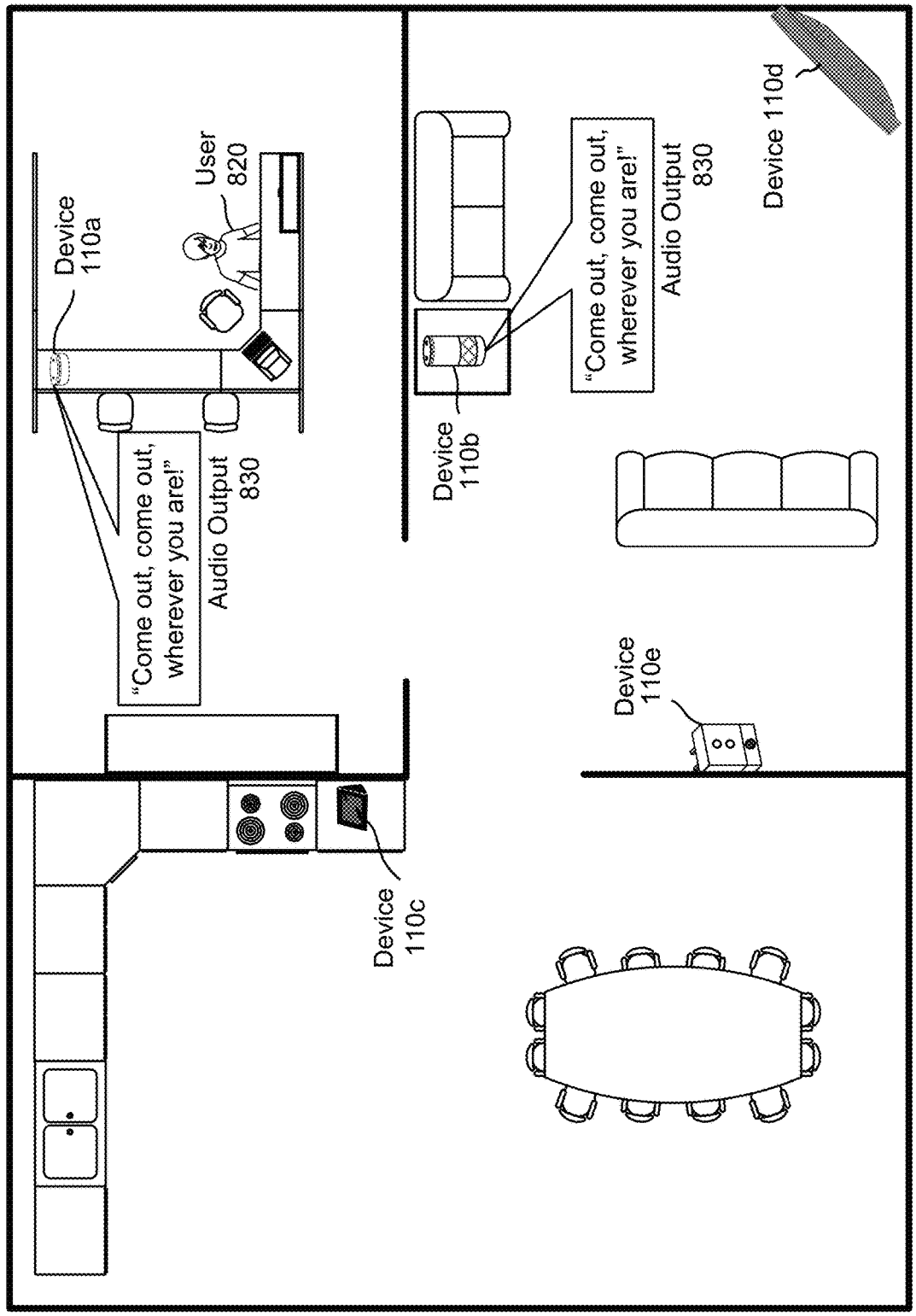
FIG. 8 is a conceptual diagram illustrating an example of playing hide and seek.

FIG. 8 is a conceptual diagram illustrating an example of playing hide and seek using the system 100. In a typical game of hide and seek, a first person may hide and a second person may try to find where the first person is hiding. To play this game using the system 100, a user may initiate the game using an input command and may attempt to hide. For example, the user may initiate the game by generating an utterance (e.g., "Alexa, let's play hide and seek"), pushing a button (e.g., on a device 110 having a touchscreen, an additional device associated with the system 100, and/or the like), inputting a command (e.g., using a smartphone configured with a user interface for the skill 290), and/or the like, and after initiating the game the user may hide.

Once the game begins, the system 100 may identify a location of the user using any technique known to one of skill in the art. As illustrated in the hide and seek example 810 illustrated in FIG. 8, the system 100 may identify the location of the user using a first speech-enabled device 110*a* located in an office area, a second speech-enabled device 110*b* located on a table in a living room area, a third speech-enabled device 110*c* located on a counter in a kitchen area, a fourth device 110*d* connected to a television in the living room area, and a fifth device 110*e* located at an outlet in the living room area.

The system 100 may use the devices 110*a*-110*e* to generate sensor data, such as motion sensor data, input data, audio data, image data, and/or the like, and may process the sensor data to generate event data. Examples of event data include a motion event (e.g., any movement detected), a user motion event (e.g., an identified user is detected), a button press event (e.g., button receives input), audio detected event (e.g., audio exceeds a threshold), speech detected event (e.g., audio exceeds a threshold and corresponds to speech), a user speech event (e.g., speech is detected that corresponds to an identified user), a location event (e.g., a location of an audio source is determined using audio beamforming, a location of an object is determined using object recognition, and/or the like), an object detected event (e.g., object is detected in image data), a face detected event (e.g., a human face is detected in image data), a user detected event (e.g., an identified user is detected in image data), and/or the like.

During the game of hide and seek, the system 100 may be configured to use event data to detect the location of the user. For example, after initiating the game, the devices 110a-110e may detect movement, audio, speech, objects, and/or the like, and may generate sensor data. Based on the sensor data, the system 100 may generate event data and use the event data to determine a location of the user. Once the system 100 determines the location of the user, the system 100 may generate output data and send the output data to one or more devices 110. The hide and seek example 810 illustrates an example in which the system 100 detects a location of a user 820 and generates audio output 830, such as "Come out, come out, wherever you are!"

In some examples, the system 100 may be configured to play games using the remote system 120 as a voice interface. For example, the devices 110 may send the event data to the smart home skill system(s) 125a, the smart home skill system(s) 125a may send the event data to the remote system 120, and the remote system 120 may process the event data to generate the output data. Thus, the remote system 120 may be configured to process the event data to generate the output data using a skill 290 that is associated with the remote system 120. However, the disclosure is not limited thereto, and in other examples the system 100 may be configured to play games using a skill system 125 that is separate from the remote system 120 without departing from the disclosure. For example, the devices 110 may send the event data to the smart home skill system(s) 125a, the smart home skill system(s) 125a may send the event data to a skill system 125, and the skill system 125 may process the event data to generate the output data. The skill system 125 may send the output data to an appropriate device 110 either directly (e.g., sending the output data from the skill system 125 to the first device 110a) or indirectly via the remote system 120 (e.g., sending the output data from the skill system 125 to the remote system 120 and from the remote system 120 to the first device 110a) without departing from the disclosure.

To illustrate an example of playing a game using a skill in more detail, the hide and seek example 810 may be associated with a first skill system 125a. Thus, after the system 100 initiates the game of hide and seek (e.g., processes an input command requesting to play hide and seek), the devices 110a-110e may detect movement, audio, speech, objects, and/or the like, may generate sensor data, may generate event data using the sensor data, and may send the event data to the smart home skill system(s) 125a. The smart home skill system(s) 125a may process the event data and/or may send the event data to the first skill system 125a. If the first skill system 125a can determine the location of the user 820 using the event data, the first skill system 125a generates the output data indicating the location of the user 820 and sends the output data to the first device 110a (e.g., either directly to the first device 110a or indirectly via the remote system 120).

As will be described in greater detail below, the smart home skill system(s) 125a may only send event data to the first skill system 125a after receiving permission from the user to begin the game of hide and seek. Additionally or alternatively, the smart home skill system(s) 125a may only send a limited amount of event data based on how the user configured the game of hide and seek. For example, the smart home skill system(s) 125a may generate a user interface that enables the user to specify device(s) 110 and/or sensor(s) to include in the game of hide and seek, as well as other criteria. Thus, the hide and seek examples 810 may only include event data generated by some of the devices 110 (e.g., first device 110a, second device 110b, and fifth device 110e, but not the third device 110c or the fourth device 110d), event data generated by some of the sensors included in the devices 110 (e.g., audio data generated by devices 110a-110e and motion sensor data generated by the fifth device 110e, but not image data generated by the third device 110c), event data associated with a designated play area, and/or the like.

In some examples, the game may end after the first skill system 125a generates the output data and sends the output data to the first device 110a. Thus, the smart home skill system(s) 125a may stop sending the event data to the first skill system 125a until the user initiates a second game of hide and seek. However, the disclosure is not limited thereto, and in other examples the game may continue until the smart home skill system(s) 125a receives a command to end the game and/or determines that a timeout event has occurred (e.g., a duration of time has elapsed from when the smart home skill system(s) 125a received the input command to begin the game). For example, after sending the output data to the first device 110a, the system 100 may indicate that a new game is beginning and initiate a countdown, enabling the user 820 to hide in a different location.

Figure 9A:
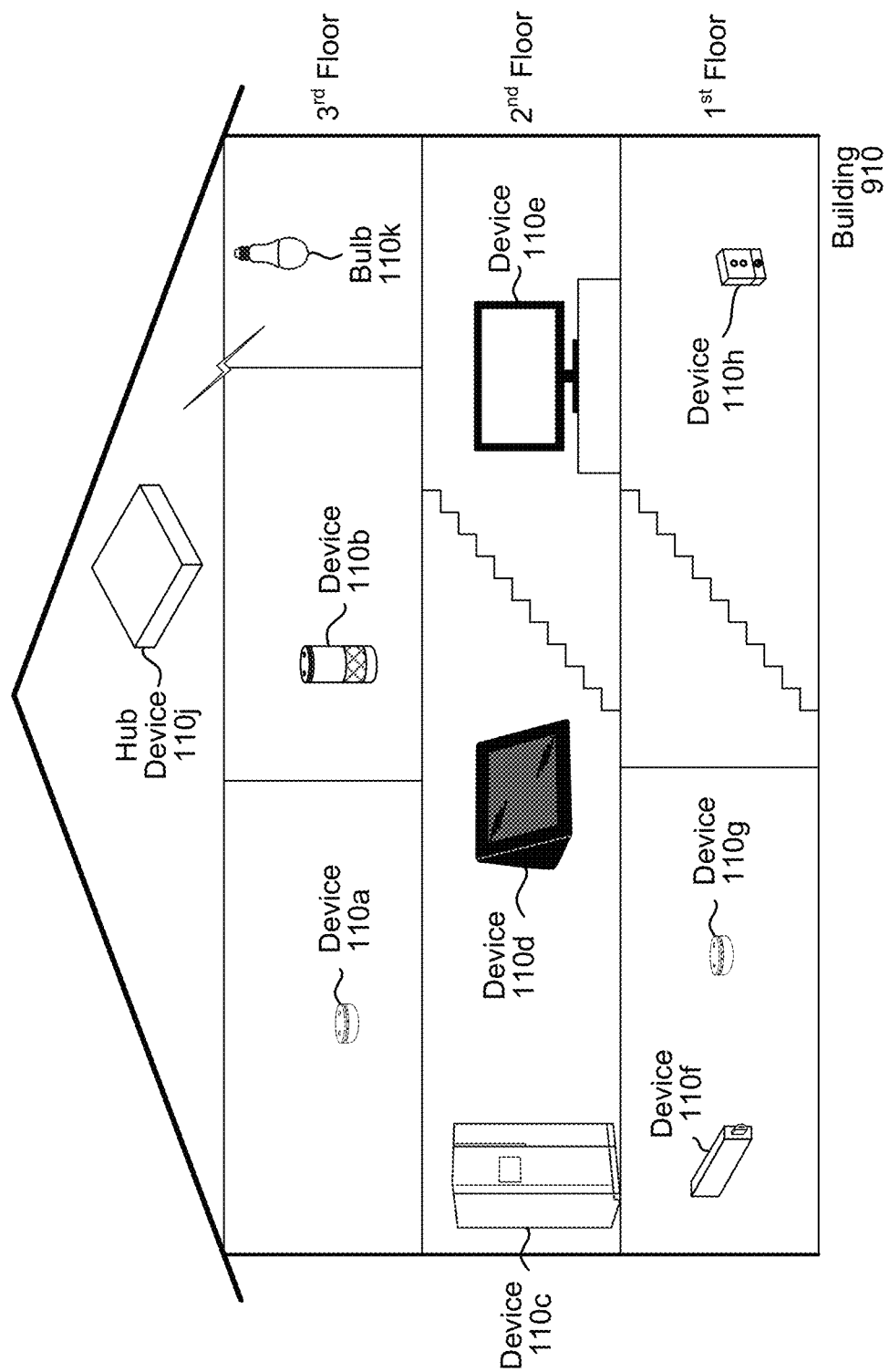

FIGS. 9A-9B illustrate examples of an environment and devices within the environment according to embodiments of the present disclosure. As illustrated in FIG. 9A, a building 910 may include multiple stories (e.g., three stories) split between multiple rooms. A plurality of devices 110a-110k may be distributed throughout the building 910. Some of the devices 110 may include one or more sensors and may generate sensor data, although the disclosure is not limited thereto. For example, devices 110a/110b may generate audio data, device 110d may generate audio data and image data, device 110h may generate audio data and motion sensor data, and so on.

As described above with regard to FIG. 4, some of the devices 110 may be configured to communicate with the network(s) 199 via a hub device. For example, FIG. 9A illustrates a bulb component 110k configured to communicate with a hub device 110j. While the bulb component 110k may not include a traditional sensor component, it may determine a current state (e.g., "ON" or "OFF") and the current state may be considered sensor data without departing from the disclosure. For example, the system 100 may detect that the bulb component 110k switches from a first state (e.g., "OFF") to a second state (e.g., "ON") and use that information to generate event data without departing from the disclosure.

Using the sensor data generated by these devices 110, the system 100 may generate event data that can be used to play games or perform other functionality. For example, a user may configure all of the devices 110 within the building 910 to be included in the game, enabling the system 100 to generate event data anywhere in the building 910 during the game. However, the disclosure is not limited thereto and in some examples, the user may configure the devices 110 such that only a portion of the building 910 is used during the game. For example, the system 100 may include event data generated by devices 110 in only a single story and/or within a designated play area without departing from the disclosure.

While FIG. 9A illustrates an example of the smart home environment corresponding to a building 910, the disclosure is not limited thereto and the smart home environment can include device(s) 110 and/or sensor components located inside and/or outside the building 910 without departing from the disclosure. For example, the system 100 may include one or more devices 110 located outside the building 910, such as an external security camera, an external motion sensor, a smart doorbell, and/or the like. Additionally or alternatively, the smart home environment may correspond to multiple buildings and/or locations without departing from the disclosure. For example, the smart home environment may correspond to a business complex or other commercial space, an outdoor space, a primary residence and a vacation residence, and/or the like without departing from the disclosure.

As illustrated in FIG. 9B, a device map 920 illustrates a layout of a single story of the building 900 that includes multiple devices 110. For example, a first speech-enabled device 110a may be located in an office area, a second speech-enabled device 110b may be located on a table in a living room area, a third speech-enabled device 110c may be located on a counter in a kitchen area, a fourth device 110d may be connected to a television in the living room area, and a fifth device 110e may be located at an outlet in the living room area.

In some examples, the system 100 may use each of these devices 110a-110e to generate event data during the game. For example, the devices 110a-110e may generate event data associated with any movement detected anywhere in the living room, the office, and/or the kitchen during the game without departing from the disclosure. However, the disclosure is not limited thereto, and in other examples the system 100 may generate a designated play area 930 or other demarcation indicating an area associated with the game without departing from the disclosure.

In some examples, the system 100 may only include event data associated with the designated play area 930 during the game without departing from the disclosure. For example, the system 100 may generate event data using each of the devices 110a-110e, but only a portion of the event data that corresponds to the designated play area 930 may be included in the game. The system 100 may determine the portion of the event data to include based on location information associated with the events (e.g., selecting events that correspond to the designated play area 930) and/or associated with the devices 110 (e.g., selecting events generated by the second device 110b, the fourth device 110d, and the fifth device 110e, as these devices are included within the designated play area 930).

While FIG. 9B illustrates an example of selecting a designated play area 930 by identifying an area within which to play the game, the disclosure is not limited thereto. In some examples, instead of selecting a specific area, the system 100 may select device(s) 110 and generate the designated play area 930 based on the layout of the devices 110. Thus, the system 100 may configure which device(s) 110 and/or sensors may be included in the game and the designated play area 930 may be determined based on this configuration data without departing from the disclosure.

In some examples, the system 100 may generate a topological map using input data received from the plurality of devices 110a-110k, although the disclosure is not limited thereto. For example, the devices 110 may communicate with each other using wireless protocols (e.g., WiFi, Bluetooth, etc.), audio signals (e.g., send and receive audio data between devices 110 within proximity to each other), and/or the like and may identify relative distances between the devices 110. Additionally or alternatively, the devices 110 may identify other devices 110 using object recognition (e.g., identify the device 110 in image data captured by a camera), audio processing (e.g., beamforming and other audio localization), and/or the like.

In the device map 920 illustrated in FIG. 9B, two or more devices 110 may be in proximity to each other, enabling the devices 110 to detect audio generated by other devices 110. For example, the first device 110a may detect audio generated by the second device 110b, the third device 110c, and/or the fourth device 110d without departing from the disclosure. Thus, the system 100 may use the devices 110 and techniques known to one of skill in the art generate an approximation of the layout (e.g., topological map). However, while FIG. 9B illustrates a specific example of four devices 110 in proximity to each other, the disclosure is not limited thereto and a number and/or type of devices 110 may vary without departing from the disclosure.

Figure 10:
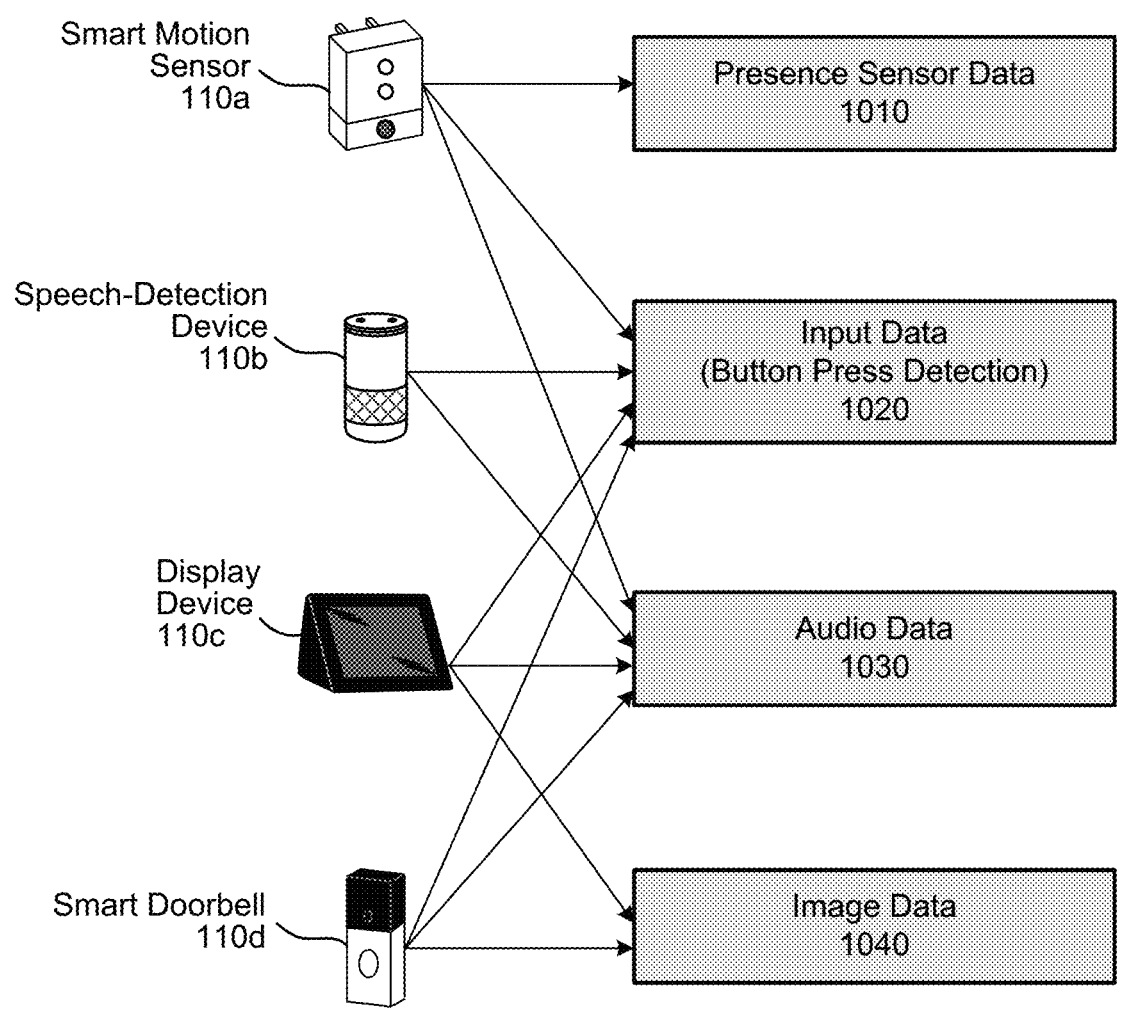
FIG. 10 is a conceptual diagram illustrating examples of raw data.

FIG. 10 is a conceptual diagram illustrating examples of sensor data. As illustrated in FIG. 10, a variety of devices 110a-110d may generate different types of sensor data, such as presence sensor data 1010 (e.g., motion sensor data, proximity data, etc.), input data 1020 (e.g., button press detection, although the disclosure is not limited thereto), audio data 1030, image data 1040, and/or the like. For example, a smart motion sensor 110a may comprise a smart outlet (e.g., smart plug) and an attached motion sensor component and may generate presence sensor data 1010, input data 1020, and audio data 1030; a speech-detection device 110b may generate input data 1020 and audio data 1030; a display device 110c may generate input data 1020, audio data 1030, and image data 1040; and a smart doorbell 110d may generate input data 1020, audio data 1030, and image data 1040, although the disclosure is not limited thereto. Thus, the devices 110 may generate sensor data using any techniques known to one of skill in the art, and an individual device 110 may be associated with specific types of sensor data based on sensors associated with the device 110.

As used herein, the presence sensor data 1010 may correspond to motion detection, presence detection, proximity detection, and/or the like. Thus, while FIG. 10 illustrates a smart motion sensor device 110a, the disclosure is not limited thereto and the presence sensor data 1010 may correspond to other presence data without departing from the disclosure.

FIGS. 11A-11B are conceptual diagrams illustrating examples of secondary processing and generating event data. As illustrated in FIG. 11A, the devices 110 may generate sensor data 1100 (e.g., presence sensor data 1010, input data 1020 (e.g., button press detection), audio data 1030, image data 1040, and/or the like). In some examples, the devices 110 may perform secondary processing 1110 locally on the device, such as audio beamforming 1112, voice recognition 1114, object/facial recognition 1116, and/or the like, although the disclosure is not limited thereto. Thus, the devices 110 may perform additional audio processing and/or image processing to the sensor data 1100 using any techniques known to one of skill in the art. However, the disclosure is not limited thereto and in other examples, the remote system 120 and/or the smart home skill system(s) 125a may perform the secondary processing 1110 without departing from the disclosure.

As illustrated in FIG. 11B, the system 100 may use the sensor data 1100 and/or the secondary processing 1110 to generate event data 1120. Examples of event data include a motion event 1130 (e.g., any movement detected), a user motion event 1135 (e.g., an identified user is detected), a button press event 1140 (e.g., button receives input), audio detected event 1145 (e.g., audio exceeds a threshold), speech detected event 1150 (e.g., audio exceeds a threshold and corresponds to speech), a user speech event 1155 (e.g., speech is detected that corresponds to an identified user based on voice recognition 1114), a location event (beamforming) 1160 (e.g., a location of an audio source is determined using audio beamforming 1112), a location event (object recognition) 1165 (e.g., a location of an object is determined using object/facial recognition 1116), an object detected event 1170 (e.g., object is detected in image data based on object/facial recognition 1116), a face detected event 1175 (e.g., a human face is detected in image data based on object/facial recognition 1116), a user detected event 1180 (e.g., an identified user is detected in image data based on object/facial recognition 1116), and/or the like, although the disclosure is not limited thereto.

In some examples, the devices 110 may generate event data 1120 based on the sensor data 1100 and/or the secondary processing 1110. For example, a first device 110*a* may generate first event data 1120*a* corresponding to a first event and send the first event data 1120*a* to the smart home skill system 125*a*. Additionally or alternatively, the first device 110*a* may generate event data 1120 based on sensor data 1100 received from multiple sensors without departing from the disclosure. For example, the first device 110*a* may generate the user speech event 1155 based on detecting speech represented in audio data 1030 and identifying a user in image data 1040 without departing from the disclosure (e.g., the user speech event 1155 is based on a combination of audio data 1030 and image data 1040). Thus, the devices 110 may generate the event data 1120 as individual events (e.g., first sensor data corresponds to a first event, second sensor data corresponds to a second event) and/or grouped events (e.g., first sensor data and second sensor data correspond to a single event) without departing from the disclosure.

To illustrate an example of individual event data, the first device 110*a* may generate a motion event 1130 indicating that motion is detected in presence sensor data 1010, a user speech event 1155 indicating that speech associated with an individual user is detected in audio data 1030, and a user detected event 1180 indicating that the individual user is detected in image data 1040. Thus, the first device 110*a* may generate three types of events corresponding to detecting the user using three different sensors at a single point in time without departing from the disclosure. Additionally or alternatively, the first device 110*a* may generate an audio detected event 1145, a speech detected event 1150, and a user speech event 1155 for the same moment that speech associated with an individual user is detected in the audio data 1030. Thus, the first device 110*a* may generate three types of events corresponding to a single sensor at a single point in time without departing from the disclosure.

To illustrate an example of grouped event data, the first device 110*a* may generate a single event that indicates the motion event 1130, the user speech event 1155, and/or the user detected event 1180. Thus, the first device 110*a* may generate a single type of event indicating that the user was detected using three different sensors at a single point in time without departing from the disclosure. Additionally or alternatively, the single event may indicate location information (e.g., location event (beamforming) 1160 and/or location event (object recognition) 1165) without departing from the disclosure.

In some examples, the devices 110 may generate event data 1120 based on sensor data 1100 received from another device 110 or external sensor component. For example, the first device 110*a* may be physically coupled to a motion sensor component and may generate the event data 1120 based on presence sensor data 1010 generated by the motion sensor component. Additionally or alternatively, the first device 110*a* may be a hub device that is communicatively coupled to remote device(s) 110 (e.g., using a wireless connection) and the first device 110*a* may generate the event data 1120 based on sensor data 1100 generated by the first device 110*a* and/or the remote device(s) 110. For example, the first device 110*a* may use first audio data 1030*a* generated by the remote device(s) 110 in addition to second audio data 1030*b* generated by the first device 110*a*, although the disclosure is not limited thereto.

In some examples, the devices 110 may send the sensor data 1100 to the smart home skill system 125*a* and the smart home skill system 125*a* may perform the secondary processing 1110 and/or generate the event data 1120. In other examples, the devices 110 may perform the secondary processing 1110 locally and send the sensor data 1100 and/or the secondary processing 1110 to the smart home skill system 125*a* and the smart home skill system 125*a* may generate the event data 1120. However, the disclosure is not limited thereto and the devices 110 may send any combination of sensor data 1100, secondary processing 1110, and/or event data 1120 to the smart home skill system 125*a* without departing from the disclosure.

In some examples the smart home skill system 125*a* may generate second event data 1120*b* based on sensor data 1100, secondary processing 1110, and/or event data 1120 (e.g., the first event data 1120*a* received from the first device 110*a*). For example, while the first device 110*a* may generate the first event data 1120*a* using information generated by a single device (e.g., based on first sensor data 1100*a* associated with the first device 110*a*), the smart home skill system 125*a* may generate second event data 1120*b* using information generated by multiple devices without departing from the disclosure. Thus, the smart home skill system 125*a* may analyze sensor data 1100, secondary processing 1110, and/or event data 1120 associated with multiple devices 110 to generate the second event data 1120*b*.

As described above, the smart home skill system(s) 125*a* may only send event data to an individual skill 290 and/or skill system 125 after receiving permission from the user (e.g., request to play a game and/or the like). Additionally or alternatively, the smart home skill system(s) 125*a* may only send a limited amount of event data based on configuration data indicating the event data accessible to the skill 290/skill system 125. For example, the smart home skill system(s) 125*a* may generate a user interface that enables the user to specify device(s) 110 and/or sensor(s) to include, as well as other criteria.

Figure 12A:
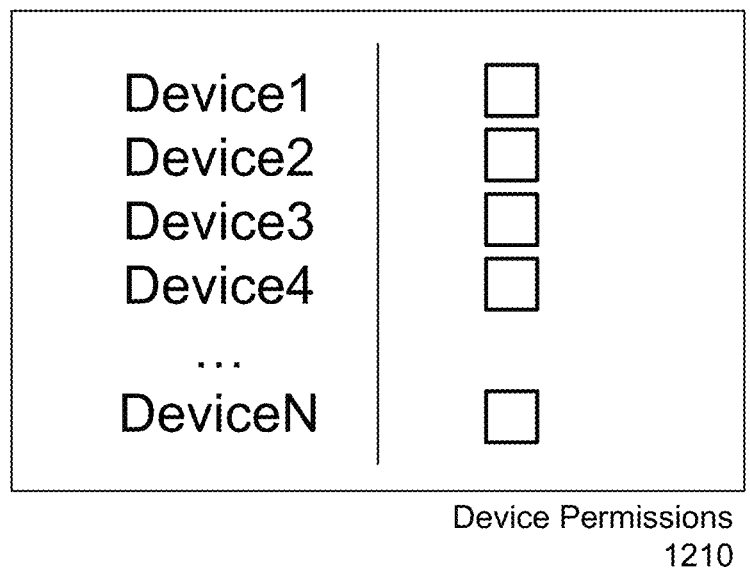

FIGS. 12A-12D are conceptual diagrams illustrating examples of controlling permissions for different devices, sensors, and/or skills. As illustrated in FIG. 12A, device permissions 1210 may enable the user to configure which devices 110 are accessible to skills. For example, the device permissions 1210 may indicate that first devices are accessible to the skill system(s) 125 but that second devices are not. Thus, the smart home skill system(s) 125*a* may send event data associated with only the first devices to the skill system(s) 125 without departing from the disclosure.

Figure 12B:
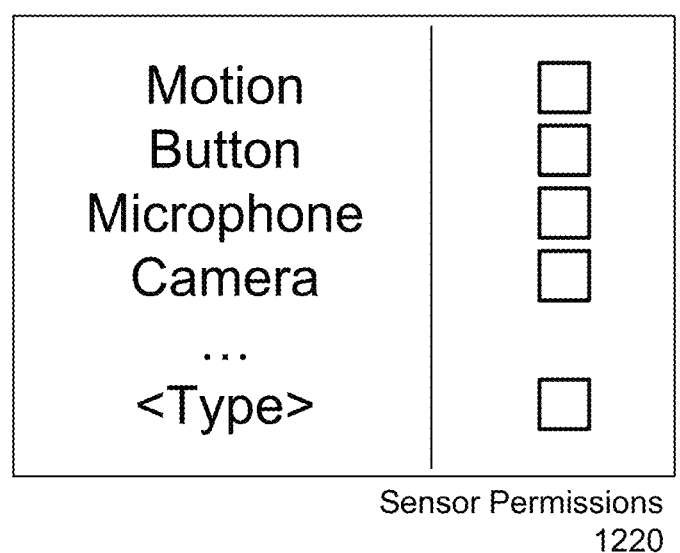

As illustrated in FIG. 12B, sensor permissions 1220 may enable the user to configure which sensors are accessible to skills. For example, the sensor permissions 1220 may indicate that first sensor (e.g., motion sensors, microphones, etc.) are accessible to the skill system(s) 125 but that second sensors (e.g., cameras) are not. Thus, the smart home skill system(s) 125*a* may send event data associated with only the first sensors to the skill system(s) 125 without departing from the disclosure.

As illustrated in FIG. 12C, detailed permissions 1230 may enable the user to configure which device(s) and/or sensor(s) are accessible to skills. Thus, the detailed permissions 1230 may indicate, for each individual device, which sensors are accessible to the skill system(s) 125. For example, the detailed permissions 1230 may indicate that a first sensor (e.g., button press input) and a third sensor (e.g., microphone) for a particular device (e.g., Device 2) are accessible, but not a second sensor (e.g., camera). Thus, the smart home skill system(s) 125*a* may send event data associated with the first sensor and the third sensor from the device (e.g., Device 2) to the skill system(s) 125 without departing from the disclosure.

As illustrated in FIG. 12D, detailed permissions 1240 may enable the user to configure which device(s) and/or sensor(s) are accessible to individual skills. Thus, the detailed permissions 1240 may indicate, for each individual device, which sensors are accessible to each individual skill system 125. For example, the detailed permissions 1240 may indicate that a second skill (e.g., Skill 2) can access any sensor associated with a first device (e.g., Device 1) but only a first sensor (e.g., button press input) and a third sensor (e.g., camera) associated with a second device (e.g., Device 2), preventing access to a second sensor (e.g., microphone). Thus, the smart home skill system(s) 125*a* may send event data associated with the first sensor (e.g., button press input) and the third sensor (e.g., camera) associated with the second device (e.g., Device 2) to a second skill system 125*b* associated with the second skill (e.g., Skill 2) without departing from the disclosure.

As illustrated in FIG. 12D, in some examples the detailed permissions 1240 may enable the user 5 to set a desired timeout interval corresponding to an amount of time to elapse before the permissions are revoked. For example, FIG. 12D illustrates that the timeout interval is set for 30 minutes, which would result in the smart home skill system(s) 125*a* sending event data to the second skill system 125*b* for 30 minutes after the system 100 received the command to start sending event data to the second skill system 125*b*. However, the disclosure is not limited thereto and the timeout interval may vary without departing from the disclosure.

While FIGS. 12A-12D illustrate examples of permissions and/or permission data, the disclosure is not limited thereto and the smart home skill system(s) 125*a* may control the permission data using any techniques known to one of skill in the art. For example, the smart home skill system(s) 125*a* may specify that access is granted only to event data associated with particular users (e.g., the second skill system 125*b* may access event data associated with a first user but not a second user), access is granted to event data excluding particular users (e.g., the second skill system 125*b* may access event data that is not associated with the second user), access is granted only to event data associated with a particular area (e.g., designated play area), and/or the like without departing from the disclosure.

FIGS. 13A-13C are network diagrams illustrating examples of enabling and disabling skills. As used herein, enabling a skill refers to configuring the system 100 to send event data to the skill during a period of time. For example, enabling a skill may correspond to beginning a game and may include setting permission data indicating event data accessible by the skill, sending a command to the skill system(s) 125*b* to launch the skill (e.g., begin the game), and/or the like without departing from the disclosure. Similarly, disabling a skill refers to configuring the system 100 to stop sending event data to the skill. For example, disabling a skill may correspond to ending a game and may include setting permission data indicating event data is no longer accessible by the skill, sending a command to the skill system(s) 125*b* to stop the skill (e.g., end the game), and/or the like without departing from the disclosure.

While not illustrated in FIGS. 13A-13C, the system 100 may authenticate the user 5 to determine whether the user 5 has permission to authorize the skill system(s) 125*b* to access the event data without departing from the disclosure. For example, the system 100 may perform authentication and/or authorization to verify that the input command is received from the user 5 and that the user 5 is authorized to grant permissions to the skill system(s) 125*b*. In some examples, the system 100 may perform user recognition on input data, such as voice recognition using input audio data, to verify the identity of the user 5. However, the disclosure is not limited thereto and the system 100 may perform user authentication using other techniques known to one of skill in the art without departing from the disclosure.

As illustrated in FIG. 13A, the user device 110*a* may receive (1310) a command to begin a skill and send (1312) the command to the smart home skill system(s) 125*a*. For example, the user device 110*a* may generate a graphical user interface and receive an input selecting the command or skill, such that the user device 110*a* sends an indication of the command itself to the smart home skill system(s) 125*a* without departing from the disclosure.

While not illustrated in FIG. 13A, in some examples the user device 110*a* may send the command to the smart home skill system(s) 125*a* via the remote system 120 without departing from the disclosure. For example, the user device 110*a* may send audio data representing an utterance to the remote system 120, the remote system 120 may process the utterance to detect the command, and then the remote system 120 may send the command to the smart home skill system(s) 125*a*. However, the disclosure is not limited thereto and the user device 110*a* may receive other input indicating the command without departing from the disclosure.

The smart home skill system(s) 125*a* may process (1314) the command to determine that a skill is granted access to event data. After processing the command to determine that the skill is granted access to the event data, the smart home skill system(s) 125*a* may generate (1316) first permission data indicating permissions associated with the skill. For example, as described above with regard to FIGS. 12A-12D, the first permission data may indicate individual device(s) 110 and/or sensor component(s) associated with the devices 110 that are accessible to the skill.

The smart home skill system(s) 125*a* may then send (1318) a command to begin the skill to the skill system(s) 125*b* associated with the skill, which may enable (1320) the skill to operate and receive event data. For ease of illustration, FIGS. 13A-13C denote the skill system(s) using "125*b*" to distinguish the skill system(s) 125*b* receiving event data from the smart home skill system(s) 125*a* sending the event data. While not illustrated in FIG. 13A, in some examples the remote system 120 may send the command to begin the skill to the skill system(s) 125*b* instead of the smart home skill system(s) 125*a*. For example, the remote system 120 may process the utterance to detect the command and may send a first command to the smart home skill system(s) 125*a* and a second command to the skill system(s) 125*b* without departing from the disclosure.

While the skill is enabled, one or more device(s) 110 may send (1322) event data to the smart home skill system(s) 125*a* and the smart home skill system(s) 125*a* may send (1324) the event data to the skill system(s) 125*b* associated with the skill. While the user device 110*a* is illustrated separately from the device(s) 110, the user device 110*a* may generate and send event data to the smart home skill system(s) 125*a* in step 1322 without departing from the disclosure. While FIG. 13A only illustrates steps 1322-1324 occurring once, this is intended for ease of illustration and the device(s) 110 may send event data to the smart home skill system(s) 125*a* and/or the smart home skill system(s) 125*a* may send the event data to the skill system(s) 125*b* repeatedly without departing from the disclosure.

The skill system(s) 125*b* may generate (1326) output data based on the event data and may send (1328) the output data to the user device 110*a*. However, the disclosure is not limited thereto, and the skill system(s) 125*b* my send the output data to the user device 110*a*, one of the device(s) 110, and/or the remote system 120 without departing from the disclosure. For example, the skill system(s) 125*b* may send the output data to a different device that is closer to a current position of the user without departing from the disclosure. Additionally or alternatively, the skill system(s) 125*b* may send the output data to the remote system 120 and the remote system 120 may generate second output data and send the second output data to the user device 110*a* and/or the device(s) 110 without departing from the disclosure.

While FIG. 13A illustrates steps 1322-1328 occurring only once, the disclosure is not limited thereto and these steps may reoccur two or more times without departing from the disclosure. For example, during a single interaction or game the skill system(s) 125*b* may receive a plurality of event data and/or send a plurality of output data without departing from the disclosure. Additionally or alternatively, the skill system(s) 125*b* may play two or more games, each involving steps 1322-1328 at least once, before the skill is disabled (e.g., the smart home skill system(s) 125*a* changes permission data so that the skill no longer has access to event data).

The system 100 may disable the skill based on receiving a command to end the skill, which is illustrated in FIG. 13B, or based on a timeout event occurring (e.g., a duration of time elapses from the skill being enabled), which is illustrated in FIG. 13C. While FIG. 13C illustrates an example of a timeout event corresponding to a duration of time elapsing, the disclosure is not limited thereto. In some examples, the system 100 may determine that a timeout event occurs when the user inputs a command to end the game and/or session, when the system 100 determines that the skill has reached a maximum number of events that the skill can access during a single session (e.g., skill is limited to receiving five unique events), when the system 100 determines that a second skill has requested event data (e.g., only one skill may access event data at a time for privacy control), when the system 100 determines that the user 5 that initiated a current session has left the environment associated with the current session (e.g., user left the house or designated play area without ending the game and/or current session), when the system 100 determines that no presence or motion is detected within the environment for a duration of time (e.g., all users left the house or designated play area), and/or the like without departing from the disclosure.

As illustrated in FIG. 13B, the system 100 may operate (1340) the skill normally. For example, the system 100 may repeat steps 1322-1328 and/or may perform additional steps as part of operating the skill (e.g., during the game). While the skill is operating, the user device 110*a* may receive (1342) a command to end the skill and may send (1344) the command to the smart home skill system(s) 125*a*. While FIG. 13B illustrates the user device 110*a* receiving the command to end the skill in step 1342, the disclosure is not limited thereto and any of the devices 110 may receive the command to end the skill without departing from the disclosure. For example, the user device 110*a* may receive the command to begin the skill in step 1310 and a second device 110*b* may receive the command to end the skill in step 1342 without departing from the disclosure.

As described above with regard to FIG. 13A, in some examples the smart home skill system(s) 125*a* may receive the command from the user device 110*a* via the remote system 120 without departing from the disclosure. For example, the system 100 may enable the user to input the command using a voice interface, with the remote system 120 processing a voice command and sending the command to the smart home skill system(s) 125*a*.

The smart home skill system(s) 125*a* may process (1346) the command to determine that the skill is no longer granted access to the event data, may generate (1348) second permission data, and may send (1350) a command to end the skill to the skill system(s) 125*b*. Thus, the system 100 may disable (1352) the skill, such that the smart home skill system(s) 125*a* does not send future event data to the skill system(s) 125*b*.

If the user does not send an explicit end command to end the skill, the system 100 may disable the skill based on a timeout event occurring after a duration of time has elapsed. As illustrated in FIG. 13C, the system 100 may operate (1360) the skill normally. For example, the system 100 may repeat steps 1322-1328 and/or may perform additional steps as part of operating the skill (e.g., during the game).

While the skill is operating, the smart home skill system(s) 125*a* may determine (1362) that permission for the skill has expired. For example, the smart home skill system(s) 125*a* may determine that the duration of time has elapsed from when the skill was first enabled. Additionally or alternatively, the smart home skill system(s) 125*a* may determine that the duration of time has elapsed from when the skill last received an input from the user (e.g., input data received from the user device 110*a*, or any device 110, directed to the skill system(s) 125*b*).

The smart home skill system(s) 125*a* may generate (1364) second permission data and may send (1366) a command to end the skill to the skill system(s) 125*b*. Thus, the system 100 may disable (1368) the skill, such that the smart home skill system(s) 125*a* does not send future event data to the skill system(s) 125*b*.

FIG. 14 is a conceptual diagram illustrating an example of sending event data to a skill. As illustrated in FIG. 14, an event interaction 1400 may correspond to the smart home skill system(s) 125*a* sending event data directly to the skill 290*b*/skill system(s) 125*b*. For example, input devices 110 may send sensor data 1405 to the smart home skill 290*a* and the smart home skill 290*a* may generate event data 1415.

As illustrated in FIG. 14, the smart home skill 290*a* may send first event data 1415*a* to an event database 1420, may optionally send second event data 1415*b* to a device 110, and may send third event data 1415*c* to a skill 290*b* and/or skill system(s) 125*b* associated with the skill 290*b*. The skill 290*b* may use the third event data 1415*c* to generate skill data 1430 and may send the skill data 1430 to the device 110, either directly as illustrated in FIG. 14 or indirectly via the remote system 120.

In some examples, the first event data 1415*a*, the second event data 1415*b*, and the third event data 1415*c* may be identical. For example, the smart home skill 290*a* may send every single event to the event database 1420, to the device 110 (e.g., primary device 110 associated with an account, smartphone associated with the user, and/or the like), and to the skill 290*b*. However, the disclosure is not limited thereto, and the first event data 1415*a*, the second event data 1415*b*, and/or the third event data 1415*c* may vary without departing from the disclosure.

In some examples, the first event data 1415*a* may correspond to all events, whereas the second event data 1415*b* and/or the third event data 1415*c* may correspond to a subset of the events. For example, while the first event data 1415*a* includes all of the events generated by the smart home skill system(s) 125*a*, the second event data 1415*b* and the third event data 1415*c* may be configured to only include certain types of events requested by the user. In some examples, the second event data 1415*b* may correspond to a first subset of events (e.g., events associated with security, such as events generated by a smart doorbell 110*d*, events indicating a person is entering a home, events indicating that new faces/users are detected by a device 110, etc.), while the third event data 1415*c* may correspond to a second subset of events (e.g., events associated with a designated play area, events associated with certain devices/sensors accessible by the skill 290*b*, etc.), although the disclosure is not limited thereto.

Figure 15:
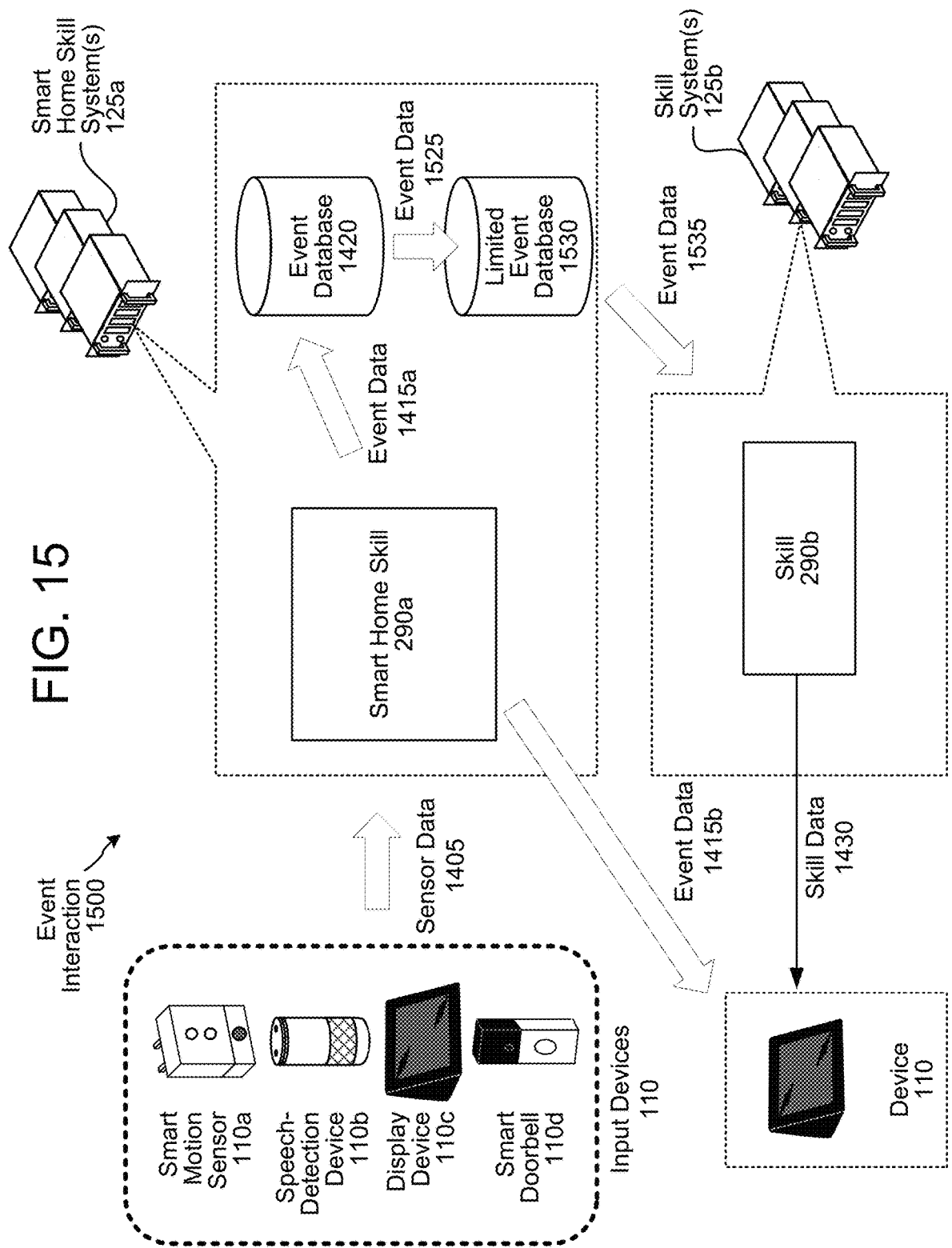
FIG. 15 is a conceptual diagram illustrating an example of generating a limited event database that is accessible to a skill.

FIG. 15 is a conceptual diagram illustrating an example of generating a limited event database that is accessible to a skill. As illustrated in FIG. 15, an event interaction 1500 may correspond to the smart home skill system(s) 125*a* sending event data to the skill 290*b*/skill system(s) 125*b* indirectly via a limited event database 1530. For example, input devices 110 may send sensor data 1405 to the smart home skill 290*a*, the smart home skill 290*a* may generate event data 1415, and the smart home skill 290*a* may send first event data 1415*a* to the event database 1420.

As illustrated in FIG. 15, the event database 1420 may send first event data 1525 to the limited event database 1530. For example, the first event data 1525 may correspond to a subset of all events that may be accessible to any of the skills 290 and/or skill system(s) 125. The limited event database 1530 may store the first event data 1525 and may optionally send second event data 1535 to a skill 290*b* and/or skill system(s) 125*b* associated with the skill 290*b*. For example, the skill 290*b* may send a request to access event data to the limited event database 1530, and in response to the request, the limited event database 1530 may identify the second event data 1535 associated with the skill 290*b* and may send the second event data 1535 to the skill 290*b*, although the disclosure is not limited thereto.

In some examples, the first event data 1525 and the second event data 1535 may be identical. For example, the limited event database 1530 may be configured specifically for the skill 290*b* and may only receive events that are accessible to the skill 290*b*. Thus, the limited event database 1530 may receive the first event data 1525 and may automatically send the second event data 1535 to the skill 290*b*. However, the disclosure is not limited thereto, and in other examples the first event data 1525 and the second event data 1535 may be different. For example, while the limited event database 1530 may be configured specifically for the skill 290*b*, the limited event database 1530 may store a plurality of separate events (e.g., first event data 1525*a* received at a first time, first event data 1525*b* received at a second time, etc.) and send the plurality of separate events to the skill 290*a* at a single time (e.g., second event data 1535 includes the first event data 1525*a*-1525*b*) without departing from the disclosure.

In some examples, the first event data 1525 may include events that are not included in the second event data 1535. For example, the limited event database 1530 may receive the first event data 1525 corresponding to a plurality of events associated with multiple skills, but may generate the second event data 1535 including only events associated with the skill 290*a*. Thus, the limited event database 1530 may process the permission data received from the smart home skill system(s) 125*a* and identify the specific events to which the skill 290*b* may access as part of generating the second event data 1525.

The skill 290*b* may use the second event data 1525 to generate the skill data 1430 and may send the skill data 1430 to the device 110, either directly as illustrated in FIG. 15 or indirectly via the remote system 120.

As described above with regard to FIG. 14, the smart home skill 290*a* may optionally send the second event data 1415*b* to the device 110 (e.g., primary device 110 associated with an account, smartphone associated with the user, and/or the like). The second event data 1415*b* may correspond to all events or a subset of the events without departing from the disclosure. For example, the second event data 1415*b* may correspond to a subset of events associated with security, such as events generated by a smart doorbell 110*d*, events indicating a person is entering a home, events indicating that new faces/users are detected by a device 110, and/or the like.

Figure 16A:
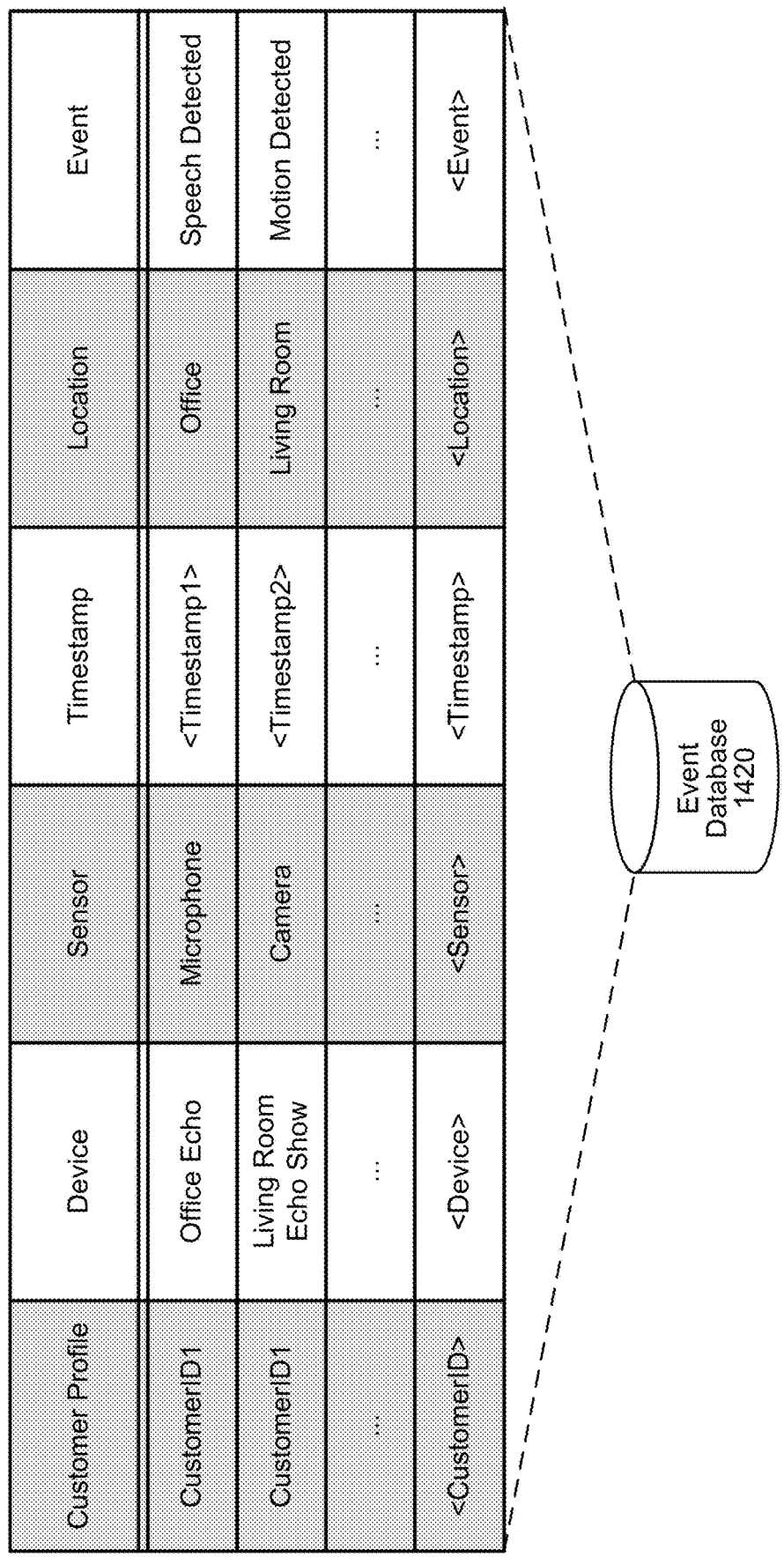
FIGS. 16A-16B illustrate examples of information included in an event database and a limited event database.
Figure 16B:
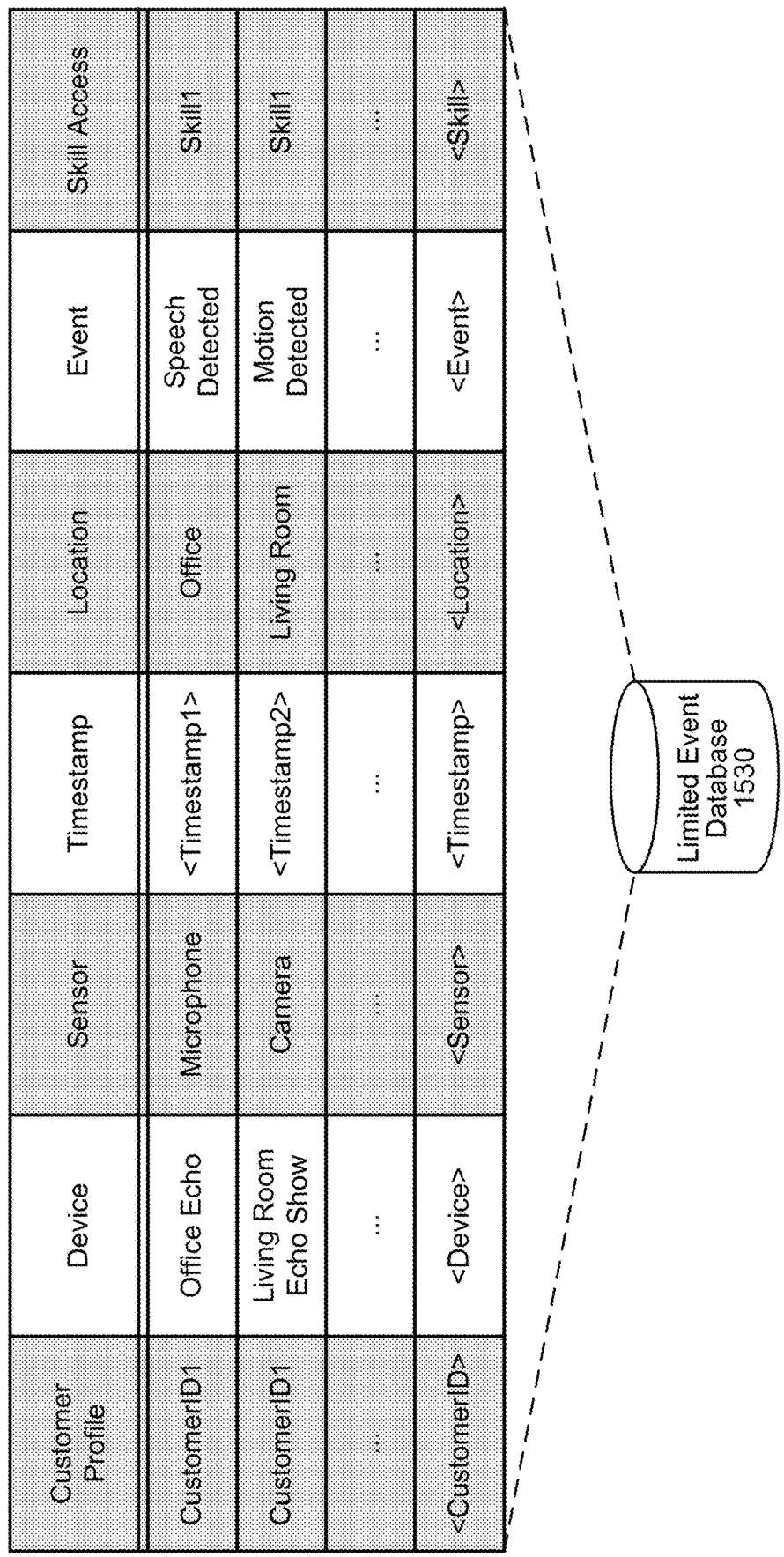

FIGS. 16A-16B illustrate examples of information included in an event database and a limited event database. As illustrated in FIG. 16A, the event database 1420 may include an entry for each of the events associated with an account. As illustrated in FIG. 16A, each entry may indicate a customer profile (e.g., customer identification) [which may correspond to a user profile (e.g., individual user) or the overall account], a device name (e.g., Office Echo, Living Room Echo Show, etc.), an indication of the sensor associated with the event (e.g., Microphone, Camera, etc.), a timestamp associated with the event, a location associated with the event (e.g., Office, Living Room, etc.), and a type of event (e.g., speech detected, motion detected, etc.), although the disclosure is not limited thereto. Thus, the event database 1420 may store information associated with each individual event.

While FIG. 16A illustrates an example of information stored in the event database 1420, the disclosure is not limited thereto and the event database 1420 may store additional information or may omit information illustrated in FIG. 16A without departing from the disclosure. For example, in addition to or in replace of the device name, the event database 1420 may include device identification (ID) (e.g., unique device identifier), an Internet Protocol (IP) address associated with the device, and/or other information without departing from the disclosure. Additionally or alternatively, in addition to or in replace of the location information, the event database 1420 may include specific location data corresponding to the event. For example, the location information may indicate a location of the device (e.g., Office), whereas the location data may indicate a precise location associated with an audio source (e.g., using audio beamforming) or an object (e.g., using object recognition) relative to the device.

As illustrated in FIG. 16B, the limited event database 1530 may include an entry for each of the events associated with an account. As illustrated in FIG. 16B, each entry may indicate a customer profile (e.g., customer identification)

[which may correspond to a user profile (e.g., individual user) or the overall account], a device name (e.g., Office Echo, Living Room Echo Show, etc.), an indication of the sensor associated with the event (e.g., Microphone, Camera, etc.), a timestamp associated with the event, a location associated with the event (e.g., Office, Living Room, etc.), a type of event (e.g., speech detected, motion detected, etc.), and a skill granted access to the event (e.g., Skill 1), although the disclosure is not limited thereto. Thus, the limited event database 1530 may store information associated with each individual event and explicitly indicate the skill(s) that are granted access to the event data.

In some examples, a single event may be associated with multiple skills, in which case the limited event database 1530 may indicate each of the skills granted access to the event information. However, the disclosure is not limited thereto, and in other examples the limited event database 1530 may generate a separate event for each skill, such that each entry indicates event information associated with a single skill without departing from the disclosure. Additionally or alternatively, the limited event database 1530 may be associated with a single skill, in which case the limited event database 1530 may not include an indication of the skill that is granted access to the event data.

While FIG. 16B illustrates an example of information stored in the limited event database 1530, the disclosure is not limited thereto and the limited event database 1530 may store additional information or may omit information illustrated in FIG. 16B without departing from the disclosure. For example, in addition to or in replace of the device name, the limited event database 1530 may include device identification (ID) (e.g., unique device identifier), an Internet Protocol (IP) address associated with the device, and/or other information without departing from the disclosure. Additionally or alternatively, in addition to or in replace of the location information, the limited event database 1530 may include specific location data corresponding to the event. For example, the location information may indicate a location of the device (e.g., Office), whereas the location data may indicate a precise location associated with an audio source (e.g., using audio beamforming) or an object (e.g., using object recognition) relative to the device.

Figure 17A:
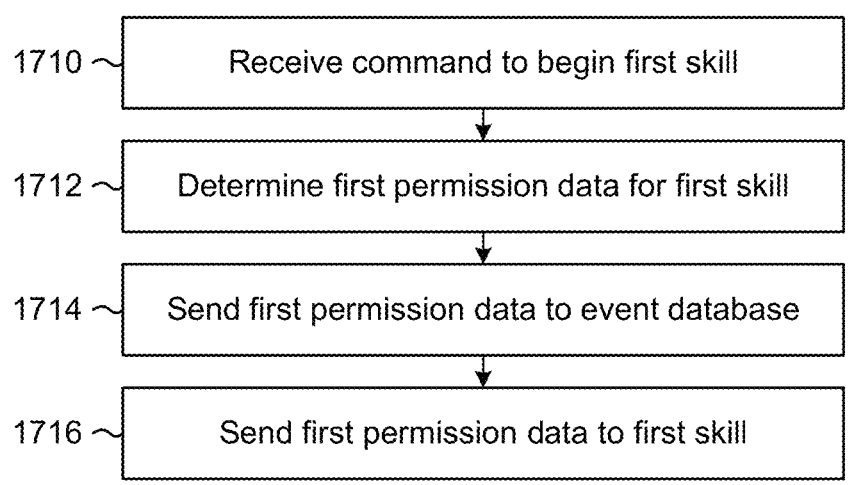
FIGS. 17A-17C are flowcharts conceptually illustrating example methods for enabling permissions for a skill and sending event data to the skill.
Figure 17B:
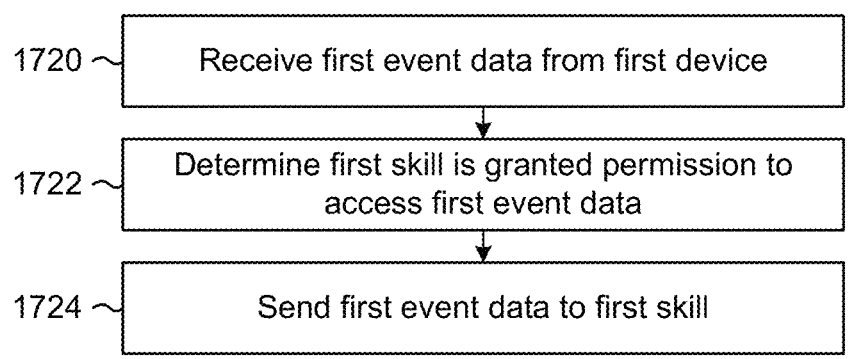
Figure 17C:
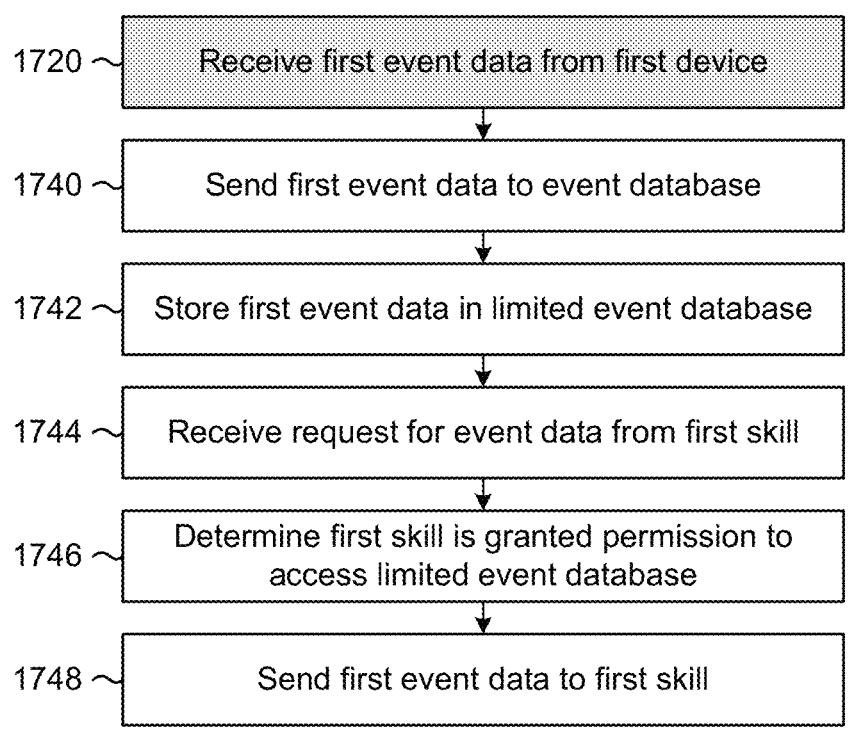

FIGS. 17A-17C are flowcharts conceptually illustrating example methods for enabling permissions for a skill and sending event data to the skill. As illustrated in FIG. 17A, the system 100 may receive (1710) a command to begin a first skill, may determine (1712) first permission data for the first skill, may send (1714) the first permission data to an event database, and may send (1716) the first permission data to the first skill. For example, the smart home skill system(s) 125a may receive the command to begin the first skill and may initialize the first skill and the event database with the first permission data indicating specific event data that the first skill is authorized to access.

As illustrated in FIG. 17B, the system 100 may receive (1720) first event data from a first device, may determine (1722) a first skill is granted permission to access the first event data, and may send (1724) the first event data to the first skill. For example, the smart home skill system(s) 125a may receive the first event data from a device 110 and may send the first event data to the first skill using any of the techniques described above.

As illustrated in FIG. 17C, the system 100 may receive (1720) the first event data from the first device, may send (1740) the first event data to an event database, and may optionally store (1742) the first event data in a limited event database, as described above with regard to FIG. 15. The system 100 may then receive (1744) a request for event data from the first skill, may determine (1746) that the first skill is granted permission to access the limited event database (e.g., or just the first event data within the limited event database), and may send (1748) the first event data to the first skill.

Figure 18A:
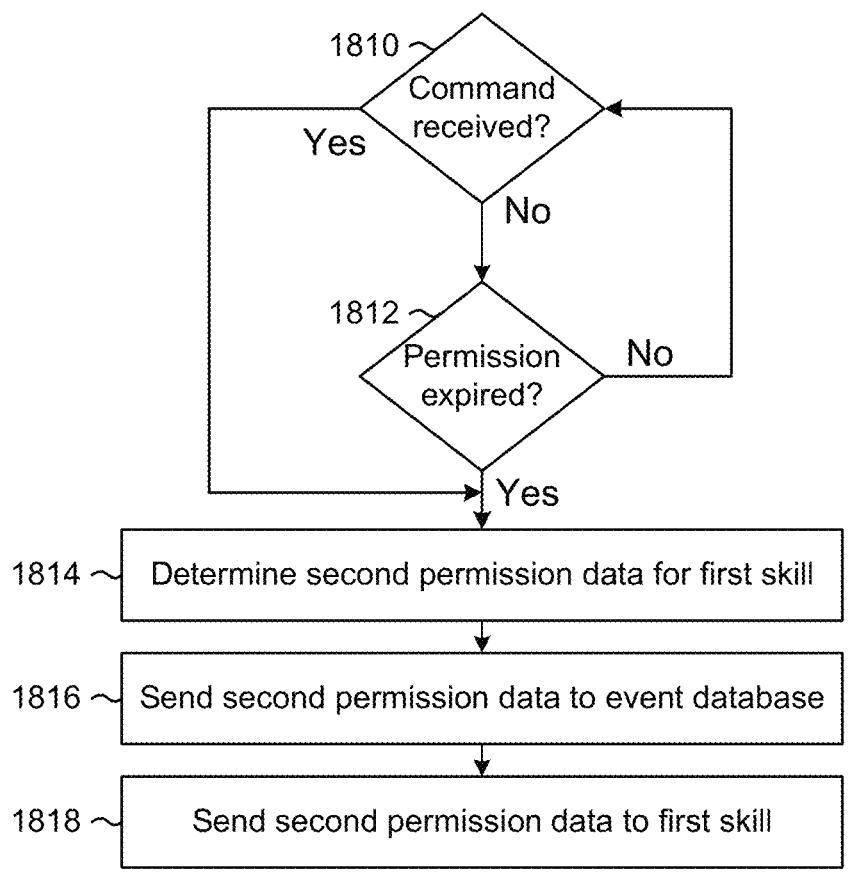
FIGS. 18A-18B are flowcharts conceptually illustrating example methods for disabling permissions for a skill.
Figure 18B:
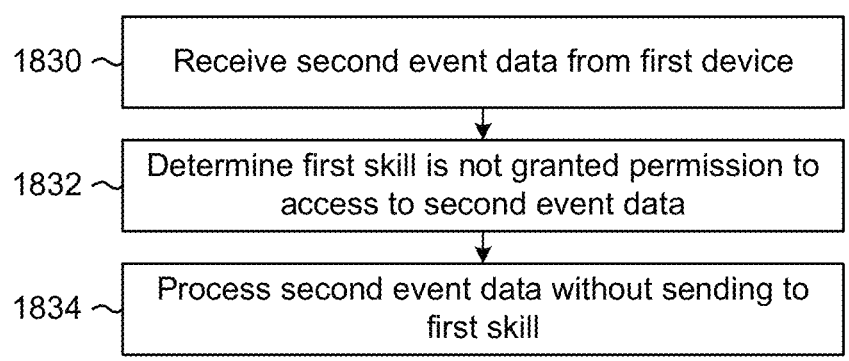

FIGS. 18A-18B are flowcharts conceptually illustrating example methods for disabling permissions for a skill. As illustrated in FIG. 18A, the system 100 may determine (1810) whether a command to end the first skill is received. If the command is received, the system 100 may skip to step 1814. If the command is not received, the system 100 may determine (1812) whether permission associated with the first skill has expired. For example, the system 100 may determine whether a time has elapsed since the first skill was granted permission to access event data. If the permission has not expired, the system 100 may loop to step 1810 and repeat steps 1810-1812 until either the command to end the first skill is received or the permission has expired.

If the command to end the first skill is received or the permission has expired, the system 100 may determine (1814) second permission data for the first skill (e.g., revoke permissions included in the first permission data), may send (1816) the second permission data to the event database, and may send (1818) the second permission data to the first skill. Thus, the system 100 may revoke access to the event data to the first skill.

As illustrated in FIG. 18B, the system 100 may receive (1830) second event data from the first device, may determine (1832) that the first skill is not granted permission to access the second event data, and may process (1834) the second event data without sending the second event data to the first skill. For example, the system 100 may determine that the first skill is not granted permission to access event data generated by the first device, although the disclosure is not limited thereto.

Figure 19:
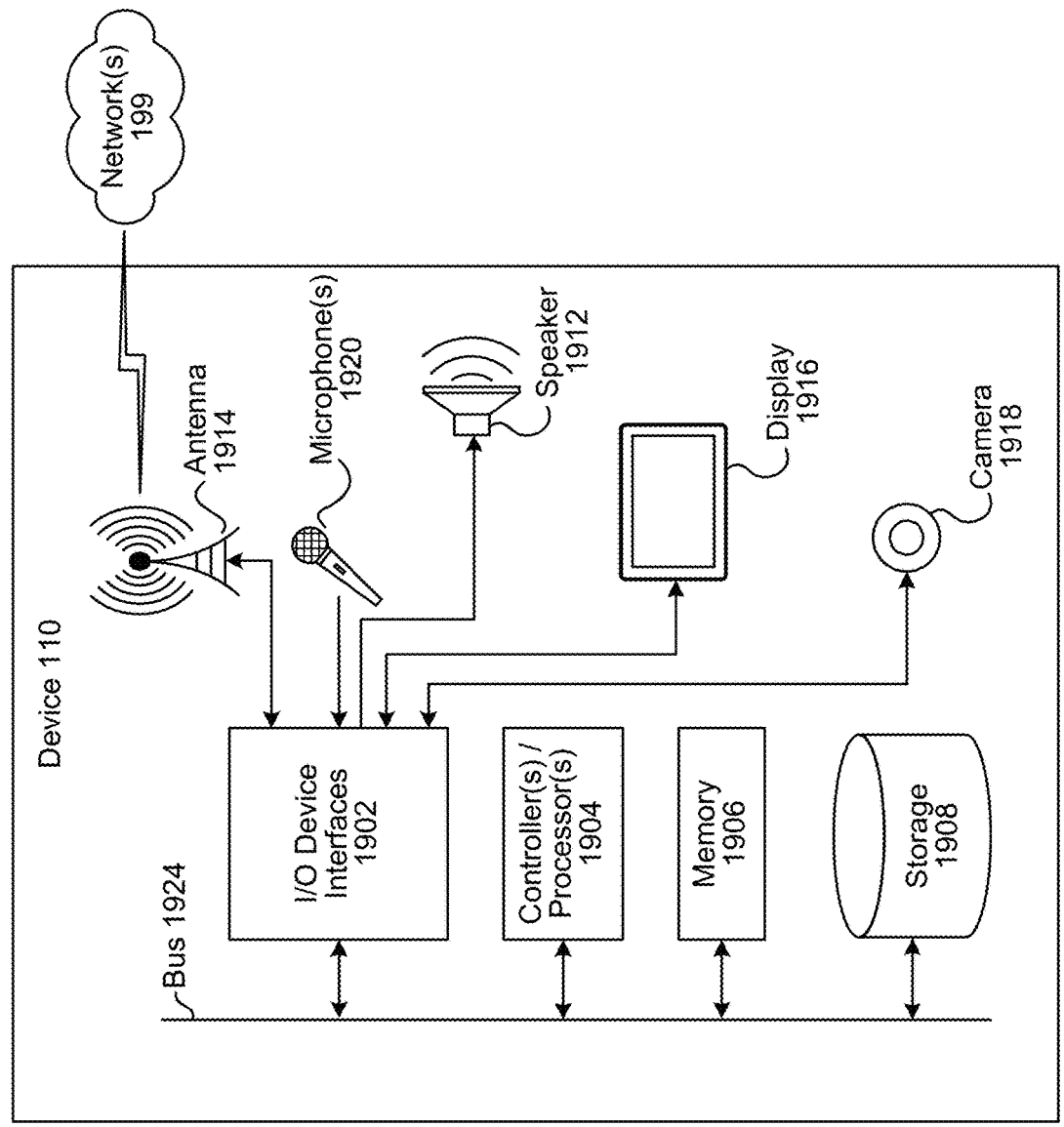
FIG. 19 is a block diagram conceptually illustrating example components of a device.
Figure 20:
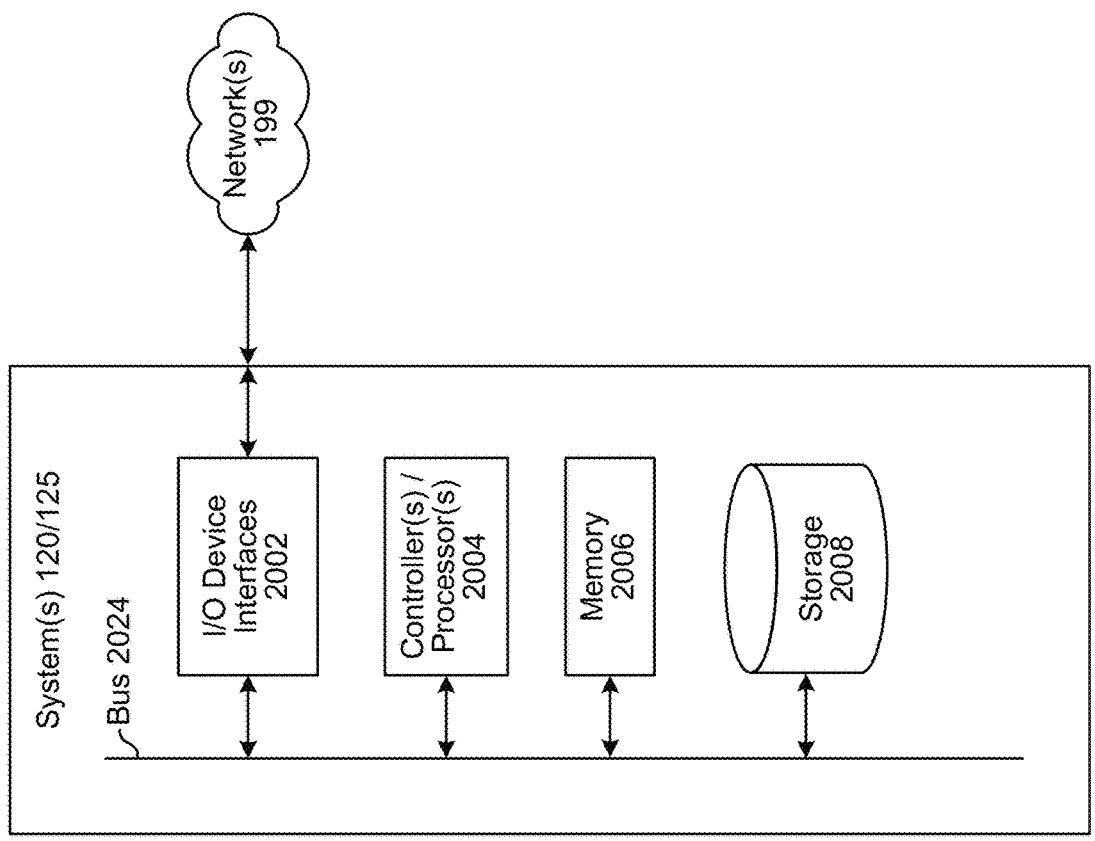
FIG. 20 is a block diagram conceptually illustrating example components of a system.

FIG. 19 is a block diagram conceptually illustrating a device 110 that may be used with the system. FIG. 20 is a block diagram conceptually illustrating example components of a remote device, such as the natural language processing remote system 120, which may assist with ASR processing, NLU processing, etc.; and skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1904/2004), which may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive memory (MRAM), and/or other types of memory. Each device (110/120/125) may also include a data storage component (1908/2008) for storing data and controller/processor-executable instructions. Each data storage component (1908/2008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1902/2002).

Computer instructions for operating each device (110/120/125) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120/125) includes input/output device interfaces (1902/2002). A variety of components may be connected through the input/output device interfaces (1902/2002), as will be discussed further below. Additionally, each device (110/120/125) may include an address/data bus (1924/2024) for conveying data among components of the respective device. Each component within a device (110/120/125) may also be directly connected to other components in addition to (or instead of) being connected to other components across the bus (1924/2024).

Referring to FIG. 19, the device 110 may include input/output device interfaces 1902 that connect to a variety of components such as an audio output component such as a speaker 1912, a wired headset or a wireless headset (not illustrated), or other component capable of outputting audio. The device 110 may also include an audio capture component. The audio capture component may be, for example, a microphone 1920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1916 for displaying content. The device 110 may further include a camera 1918.

Via antenna(s) 1914, the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1902/2002) may also include communication components that allow data to be exchanged between devices such as different physical servers in a collection of servers or other components.

The components of the device 110, the natural language processing remote system 120, and/or skill system(s) 125 may include their own dedicated processors, memory, and/or storage. Alternatively, one or more of the components of the device 110, the natural language processing remote system 120, and/or skill system(s) 125 may utilize the I/O interfaces (1902/2002), processor(s) (1904/2004), memory (1906/2006), and/or storage (1908/2008) of the device(s) 110, natural language processing remote system 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing remote system 120, and skill system(s) 125, as described herein, are illustrative, and may be located as a stand-alone device or may be included, in whole or in part, as a component of a larger device or system.

Figure 21:
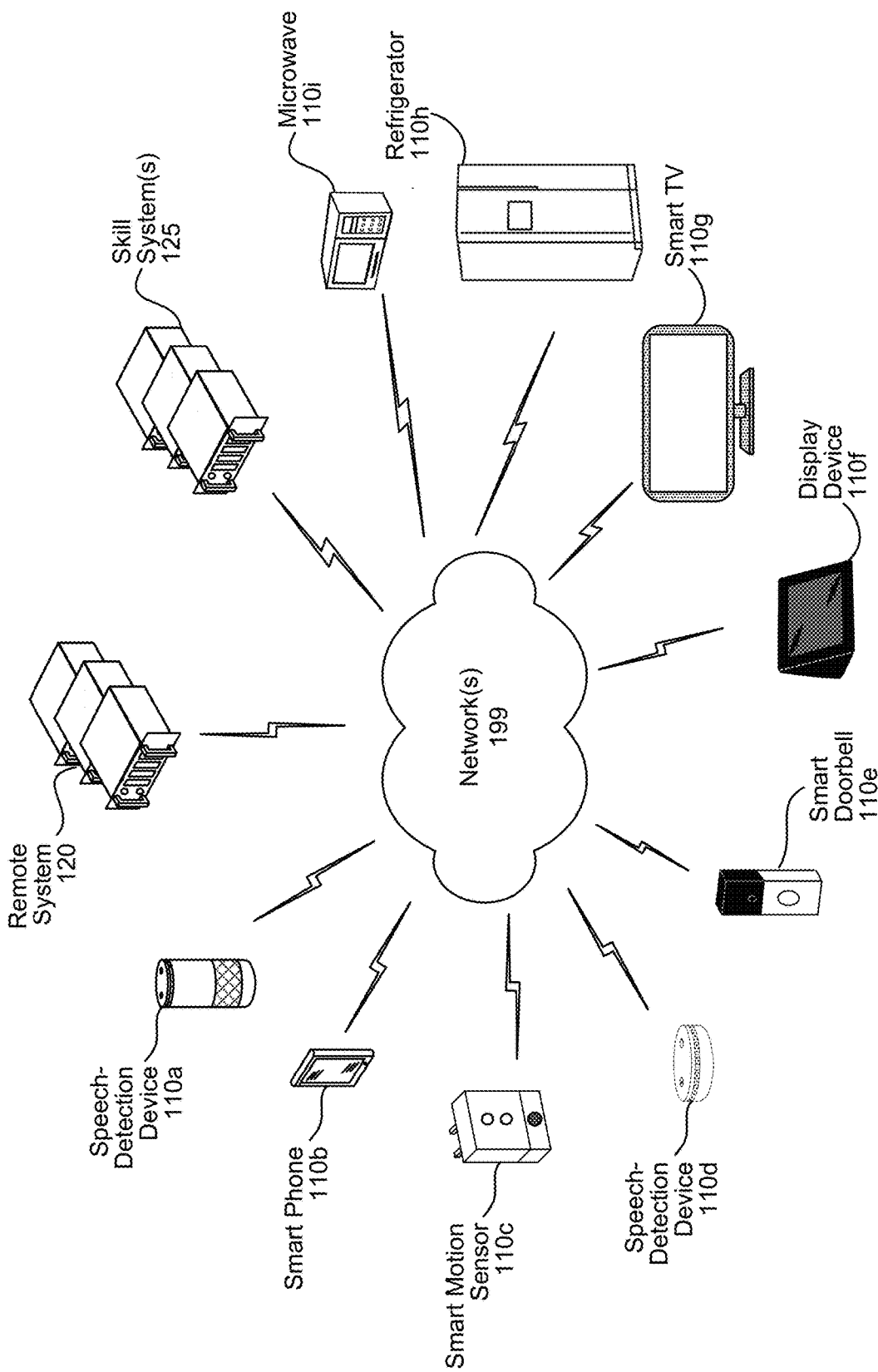
FIG. 21 illustrates an example of a computer network for use with the overall system.

As illustrated in FIG. 21, multiple devices (110a-110i, 120, 125, 130) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart motion sensor 110c, a speech-detection device 110d, a smart doorbell 110e, a display device 110f, a smart television 110g, a refrigerator 110h, and/or a microwave 110i may be connected to the network(s) 199 through a wireless service provider, over a WiFi or cellular network connection, or the like. Other devices are included as network-connected support devices, such as the natural language processing remote system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language processing remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, from a first device associated with a user profile, a first request to configure permissions for a first skill, the first skill configured to execute a plurality of actions;
   sending, to the first device, output data indicating a first sensor component and a second sensor component associated with the user profile, the first sensor component associated with a second device and configured to detect motion;
   receiving, from the first device, first data indicating that the first skill is granted access to event data associated with the first sensor component;
   storing the first data;
   receiving, from a voice enabled device associated with the user profile, first input data representing a first natural language input;
   determining that the first input data corresponds to a second request to perform a first action associated with the first skill;
   determining, using the first data, that the first skill is permitted to access the event data associated with the first sensor component, the event data indicating that motion is detected in proximity to the second device;
   receiving, from the second device, first event data associated with the first sensor component;
   determining, using the first data, that the first skill is permitted to access the first event data;
   sending the first event data to an event database and the first skill;
   determining that a duration of time has elapsed since receiving the first input data;
   determining, in response to the duration of time elapsing, second data indicating that the first skill is not permitted to access the event data associated with the first sensor component;
   receiving second event data associated with the first sensor component;
   determining, using the second data, that the first skill is not granted access to the second event data; and
   sending the second event data to the event database.

2. The computer-implemented method of claim 1, wherein receiving the second event data comprises receiving the second event data from the second device.

3. The computer-implemented method of claim 1, further comprising:
   receiving second input data representing a second natural language input;
   determining that the second input data corresponds to a third request to perform a second action associated with the first skill, the second action causing the first skill to end a session;
   determining, in response to the second action, third data indicating that the first skill is not granted access to the event data associated with the first sensor component;
   receiving third event data associated with the first sensor component;
   determining, using the third data, that the first skill is not granted access to the third event data; and
   sending the third event data to the event database.

4. A computer-implemented method, the method comprising:
   receiving a first request to perform a first action, the first request corresponding to a user profile;
   determining that the user profile is associated with at least a first sensor component, the first sensor component corresponding to a first stationary location in an environment;
   determining that the first action corresponds to at least the first sensor component;
   determining first permission data authorizing access to first event data corresponding to at least the first sensor component;
   generating first output data indicating at least one of the first stationary location or a first device associated with the first sensor component;

receiving, from the first device, second event data corresponding to the first sensor component;
determining that the second event data satisfies a condition;
causing a second action to be performed;
determining that a first duration of time has elapsed after determining the first permission data; and
in response to the first duration of time elapsing, determining second permission data revoking access to the first event data corresponding to at least the first sensor component.

5. The computer-implemented method of claim 4, further comprising:
receiving a second request to perform a second action; and
determining, in response to the second request, third permission data revoking access to the first event data corresponding to at least the first sensor component.

6. The computer-implemented method of claim 4, further comprising:
storing the second event data in a first database;
receiving a second request to access third event data stored in the first database;
determining, using the first permission data, that access is authorized to the third event data; and
sending the third event data, the third event data including the second event data.

7. The computer-implemented method of claim 4, further comprising, prior to receiving the first request:
generating second output data indicating a plurality of sensor components associated with the user profile;
sending the second output data to a second device associated with the user profile; and
receiving, from the second device, first input data authorizing access to third event data associated with one or more sensor components of the plurality of sensor components, the one or more sensor components including the first sensor component.

8. The computer-implemented method of claim 4, further comprising:
generating second output data indicating at least one of a second stationary location in the environment or a second device associated with a second sensor component;
sending the second output data to the first device;
receiving, from the second device, third event data corresponding to the second sensor component;
determining that the third event data satisfies the condition; and
causing a third action to be performed.

9. The computer-implemented method of claim 4, further comprising:
receiving, from a first skill, a second request for a list of sensor components associated with the user profile;
determining, using the first permission data, that the first skill is authorized to access third event data corresponding to at least the first sensor component and a second sensor component;
generating second output data, the second output data including at least a first identifier associated with the first sensor component, a first type of sensor corresponding to the first sensor component, a second identifier associated with the second sensor component, and a second type of sensor corresponding to the second sensor component; and
sending the second output data to the first skill.

10. The computer-implemented method of claim 9, further comprising:
receiving, from the first device, fourth event data corresponding to the first sensor component;
sending, to the first skill, the fourth event data;
determining that the first duration of time has elapsed after receiving the second request; and
determining third permission data revoking access to the third event data for the first skill.

11. A system comprising:
at least one processor; and
memory including instructions operable to be executed by the at least one processor to cause the system to:
receive a first request to perform a first action, the first request corresponding to a user profile;
determine that the user profile is associated with at least a first sensor component, the first sensor component corresponding to a first stationary location in an environment;
determine that the first action corresponds to at least the first sensor component;
determine first permission data authorizing access to first event data corresponding to at least the first sensor component;
generate first output data indicating at least one of the first stationary location or a first device associated with the first sensor component;
receive, from the first device, second event data corresponding to the first sensor component;
determine that the second event data satisfies a condition;
cause a second action to be performed;
store the second event data in a first database;
receive a second request to access third event data stored in the first database;
determine, using the first permission data, that access is authorized to the third event data; and
send the third event data, the third event data including the second event data.

12. The system of claim 11, wherein the memory further comprises instructions that, when executed by the at least one processor, further cause the system to:
receive a third request to perform a second action; and
determine, in response to the third request, second permission data revoking access to the first event data corresponding to at least the first sensor component.

13. The system of claim 11, wherein the memory further comprises instructions that, when executed by the at least one processor, further cause the system to:
determine that a first duration of time has elapsed after determining the first permission data; and
in response to the first duration of time elapsing, determine second permission data revoking access to the first event data corresponding to at least the first sensor component.

14. The system of claim 11, wherein the memory further comprises instructions that, when executed by the at least one processor, further cause the system to, prior to receiving the first request:
generate second output data indicating a plurality of sensor components associated with the user profile;
send the second output data to a second device associated with the user profile; and
receive, from the second device, first input data authorizing access to fourth event data associated with one or more sensor components of the plurality of sensor components, the one or more sensor components including the first sensor component.

15. The system of claim 11, wherein the memory further comprises instructions that, when executed by the at least one processor, further cause the system to:
   generate second output data indicating at least one of a second stationary location in the environment or a second device associated with a second sensor component;
   send the second output data to the first device;
   receive, from the second device, fourth event data corresponding to the second sensor component;
   determine that the fourth event data satisfies the condition; and
   cause a third action to be performed.

16. The system of claim 11, wherein the memory further comprises instructions that, when executed by the at least one processor, further cause the system to:
   receive, from a first skill, a third request for a list of sensor components associated with the user profile;
   determine, using the first permission data, that the first skill is authorized to access fourth event data corresponding to at least the first sensor component and a second sensor component;
   generate second output data, the second output data including at least a first identifier associated with the first sensor component, a first type of sensor corresponding to the first sensor component, a second identifier associated with the second sensor component, and a second type of sensor corresponding to the second sensor component; and
   send the second output data to the first skill.

17. The system of claim 16, wherein the memory further comprises instructions that, when executed by the at least one processor, further cause the system to:
   receive, from the first device, fifth event data corresponding to the first sensor component;
   send, to the first skill, the fifth event data;
   determine that a first duration of time has elapsed after receiving the third request; and
   determine second permission data revoking access to the fourth event data for the first skill.

* * * * *